(12) United States Patent
Ferguson

(10) Patent No.: US 8,963,498 B2
(45) Date of Patent: Feb. 24, 2015

(54) MODULAR HAND-HELD ELECTRONIC DEVICE CHARGING AND MONITORING SYSTEM

(75) Inventor: Joel Ferguson, Woodbridge (CA)

(73) Assignee: RTF Research and Technologies Inc., Caledon (CA)

(*) Notice: Subject to any disclaimer, the term of this patent is extended or adjusted under 35 U.S.C. 154(b) by 750 days.

(21) Appl. No.: 13/266,708

(22) PCT Filed: Apr. 23, 2010

(86) PCT No.: PCT/CA2010/000627
§ 371 (c)(1),
(2), (4) Date: Oct. 27, 2011

(87) PCT Pub. No.: WO2010/124374
PCT Pub. Date: Nov. 4, 2010

(65) Prior Publication Data
US 2012/0043936 A1    Feb. 23, 2012

(30) Foreign Application Priority Data

Apr. 27, 2009    (CA) ..................................... 2664237

(51) Int. Cl.
| | | |
|---|---|---|
| *H02J 7/00* | (2006.01) | |
| *G08B 13/14* | (2006.01) | |
| *H01R 13/72* | (2006.01) | |
| *B65H 75/48* | (2006.01) | |
| *H02G 11/02* | (2006.01) | |

(52) U.S. Cl.
CPC ............... *H01R 13/72* (2013.01); *B65H 75/48* (2013.01); *H02G 11/02* (2013.01); *B65H 2701/3919* (2013.01)

USPC .......................... 320/114; 320/107; 340/568.1

(58) Field of Classification Search
CPC ........................................................ Y02E 60/12
USPC ..................................................... 320/114, 107
See application file for complete search history.

(56) References Cited

U.S. PATENT DOCUMENTS

| | | |
|---|---|---|
| 4,455,464 A | 6/1984 | Leyden |
| 5,103,984 A | 4/1992 | Leyden et al. |

(Continued)

FOREIGN PATENT DOCUMENTS

| | | |
|---|---|---|
| EP | 0167738 A2 | 1/1986 |
| GB | 2344379 A | 6/2000 |

OTHER PUBLICATIONS

International Search Report dated Aug. 10, 2010 from corresponding International Patent Application No. PCT/CA2010/000627—4 pages.

(Continued)

*Primary Examiner* — Edward Tso
*Assistant Examiner* — Ahmed Omar
(74) *Attorney, Agent, or Firm* — Maier & Maier, PLLC

(57) ABSTRACT

This specification relates to a charging, securing and monitoring system for hand-held electronic devices such as cell phones, BlackBerry's, PDA's, cameras, or the like and the components therefore. More particularly the teachings herein include a coaxial cable construction that permits securing and charging of said hand-held devices which are on display at a typical retailer. Further the cable may be accumulated on a unique recoiler assembly at one end of the coaxial cable and engages a unique holding device proximate the other end thereof.

33 Claims, 20 Drawing Sheets

(56) References Cited

U.S. PATENT DOCUMENTS

| | | |
|---|---|---|
| 5,107,076 A | 4/1992 | Bullock et al. |
| 5,124,685 A | 6/1992 | Rankin |
| 5,146,205 A | 9/1992 | Keifer et al. |
| 5,154,072 A | 10/1992 | Leyden |
| 5,160,048 A | 11/1992 | Leyden et al. |
| 5,172,098 A | 12/1992 | Leyden et al. |
| D335,439 S | 5/1993 | Leyden et al. |
| 5,246,183 A | 9/1993 | Leyden |
| 5,279,135 A | 1/1994 | Leyden et al. |
| D345,092 S | 3/1994 | Leyden et al. |
| 5,341,124 A | 8/1994 | Leyden et al. |
| 5,345,219 A | 9/1994 | Rogers |
| 5,345,220 A | 9/1994 | Wachsman |
| 5,421,667 A | 6/1995 | Leyden et al. |
| 5,467,075 A | 11/1995 | Rand |
| 5,543,782 A | 8/1996 | Rothbaum et al. |
| 5,552,771 A | 9/1996 | Leyden et al. |
| 5,555,302 A | 9/1996 | Wang |
| 5,561,417 A | 10/1996 | Rothbaum et al. |
| 5,565,848 A | 10/1996 | Leyden et al. |
| 5,577,855 A | 11/1996 | Leyden et al. |
| 5,590,749 A | 1/1997 | Wagner et al. |
| D383,991 S | 9/1997 | Leyden et al. |
| 5,671,833 A | 9/1997 | Edwards et al. |
| 5,676,258 A | 10/1997 | Leyden et al. |
| 5,699,591 A | 12/1997 | Kane |
| 5,726,627 A | 3/1998 | Kane et al. |
| 5,796,337 A | 8/1998 | Wachsman |
| 5,821,857 A | 10/1998 | Rand |
| 5,823,358 A | 10/1998 | Leyden et al. |
| 5,861,807 A | 1/1999 | Leyden et al. |
| 5,886,633 A | 3/1999 | Adams |
| 5,889,463 A | 3/1999 | Judd et al. |
| 5,903,645 A | 5/1999 | Tsay |
| 5,936,525 A | 8/1999 | Leyden et al. |
| 6,002,921 A | 12/1999 | Pfahlert et al. |
| 6,003,685 A | 12/1999 | Malin |
| 6,027,277 A | 2/2000 | Leyden et al. |
| 6,039,498 A | 3/2000 | Leyden et al. |
| 6,087,939 A | 7/2000 | Leyden et al. |
| 6,104,289 A | 8/2000 | Rand |
| 6,147,603 A | 11/2000 | Rand |
| 6,278,365 B1 | 8/2001 | Kane et al. |
| 6,285,283 B1 | 9/2001 | Rand et al. |
| 6,300,874 B1 | 10/2001 | Rand |
| 6,349,808 B1 | 2/2002 | Bryant |
| RE37,590 E | 3/2002 | Leyden et al. |
| 6,459,374 B1 | 10/2002 | Rand et al. |
| 6,560,710 B1 | 5/2003 | Leyden et al. |
| 6,659,382 B2 | 12/2003 | Ryczek |
| 6,700,488 B1 | 3/2004 | Leyden et al. |
| 6,756,900 B2 | 6/2004 | Leyden et al. |
| 6,799,994 B2 | 10/2004 | Burke |
| 6,861,953 B2 | 3/2005 | Deconinck et al. |
| 6,927,689 B2 | 8/2005 | Frederiksen et al. |
| 6,946,961 B2 | 9/2005 | Frederiksen et al. |
| 6,952,166 B2 | 10/2005 | Lee |
| 6,956,479 B2 | 10/2005 | Kelsch et al. |
| 7,002,467 B2 | 2/2006 | Deconinck et al. |
| 7,021,091 B2 | 4/2006 | Leyden et al. |
| 7,053,774 B2 | 5/2006 | Sedon et al. |
| 7,081,822 B2 | 7/2006 | Leyden et al. |
| 7,101,187 B1 | 9/2006 | Deconinck et al. |
| 7,132,952 B2 | 11/2006 | Leyden et al. |
| 7,135,972 B2 | 11/2006 | Bonato |
| 7,154,039 B1 | 12/2006 | Marszalek et al. |
| 7,187,283 B2 | 3/2007 | Leyden et al. |
| 7,202,417 B2 | 4/2007 | Marszalek et al. |
| 7,202,786 B2 | 4/2007 | Marszalek et al. |
| 7,204,107 B2 | 4/2007 | Leyden et al. |
| 7,209,038 B1 | 4/2007 | Deconinck et al. |
| 7,223,917 B1 | 5/2007 | Marszalek et al. |
| 7,242,299 B2 | 7/2007 | Kelsch et al. |
| 7,327,276 B1 | 2/2008 | Deconinck et al. |
| 7,370,840 B1 | 5/2008 | Deconinck |
| 7,384,304 B1 | 6/2008 | Fawcett |
| 7,387,003 B2 | 6/2008 | Marszalek et al. |
| 7,392,673 B2 | 7/2008 | Fawcett et al. |
| 7,403,117 B2 | 7/2008 | Leyden et al. |
| 7,426,997 B2 | 9/2008 | Nagelski |
| 7,445,175 B2 | 11/2008 | Leyden et al. |
| 7,446,659 B2 | 11/2008 | Marsilio et al. |
| 7,487,652 B2 | 2/2009 | Marszalek et al. |
| 7,504,944 B2 | 3/2009 | Marszalek et al. |
| 2004/0046662 A1 | 3/2004 | Leyden et al. |
| 2004/0206542 A1 | 10/2004 | Gladd et al. |
| 2004/0231376 A1 | 11/2004 | Leyden et al. |
| 2005/0040948 A1 | 2/2005 | Frederiksen et al. |
| 2005/0134458 A1 | 6/2005 | Leyden et al. |
| 2006/0001541 A1 | 1/2006 | Leyden et al. |
| 2006/0045613 A1 | 3/2006 | Leyden et al. |
| 2006/0103528 A1 | 5/2006 | Leyden et al. |
| 2006/0238342 A1 | 10/2006 | Leyden et al. |
| 2006/0290368 A1 | 12/2006 | Korting et al. |
| 2007/0007379 A1 | 1/2007 | Leyden et al. |
| 2007/0194918 A1 | 8/2007 | Rabinowitz et al. |
| 2007/0229259 A1 | 10/2007 | Irmscher et al. |
| 2007/0294764 A1 | 12/2007 | Leyden |
| 2008/0035778 A1 | 2/2008 | Belden et al. |
| 2008/0054127 A1 | 3/2008 | Leyden et al. |
| 2008/0224865 A1 | 9/2008 | Leyden et al. |
| 2009/0079566 A1 | 3/2009 | Goldstein et al. |

OTHER PUBLICATIONS http://web.archive.org/web/20080326103637http://www.theftdeter.com/recoilers.html—Mar. 26, 2008.

"International Preliminary Report on Patentability" Issued by the International Bureau of WIPO in the corresponding International Patent Application No. PCT/CA2010/000627. Geneva, Switzerland. Nov. 1, 2012.

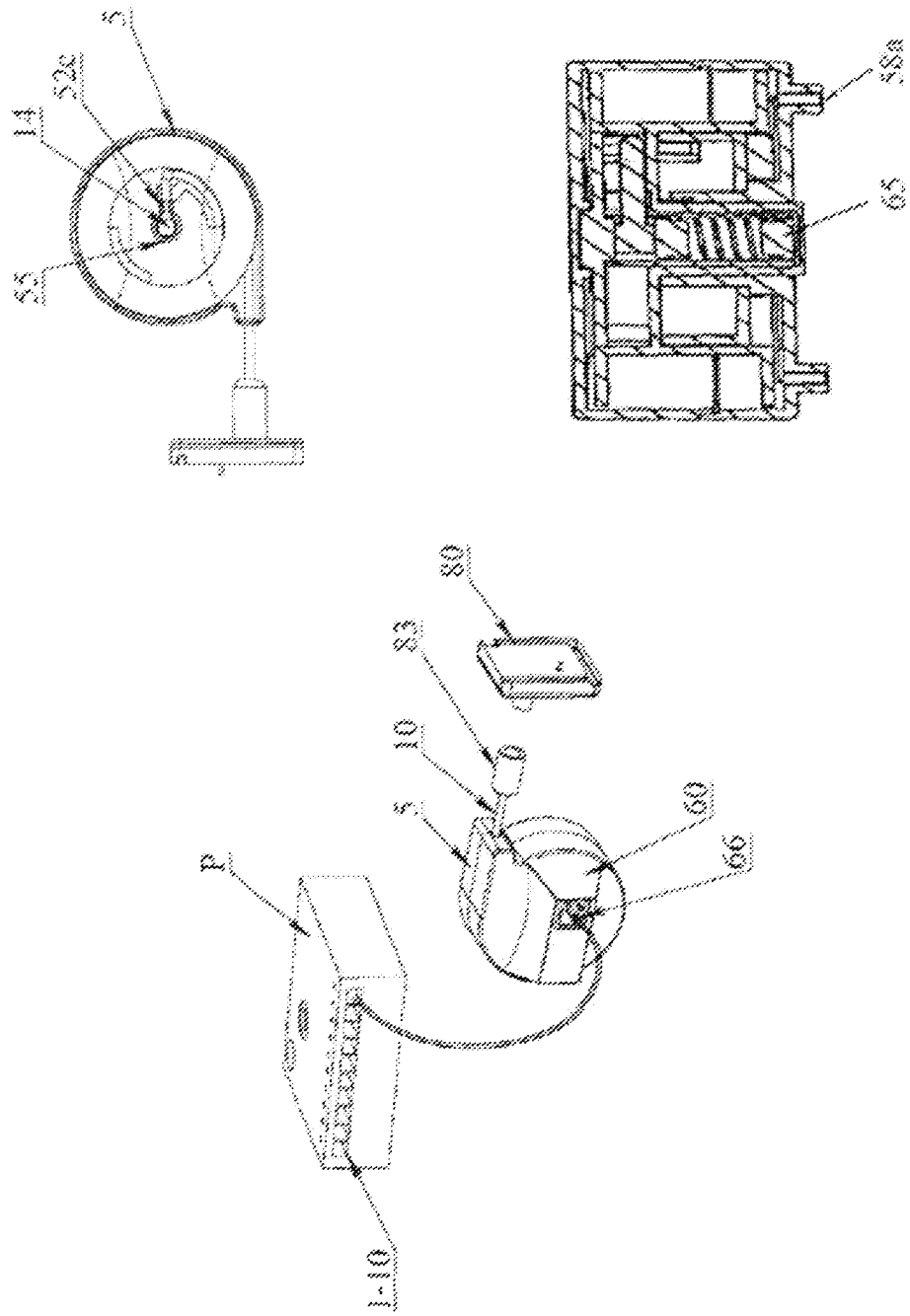

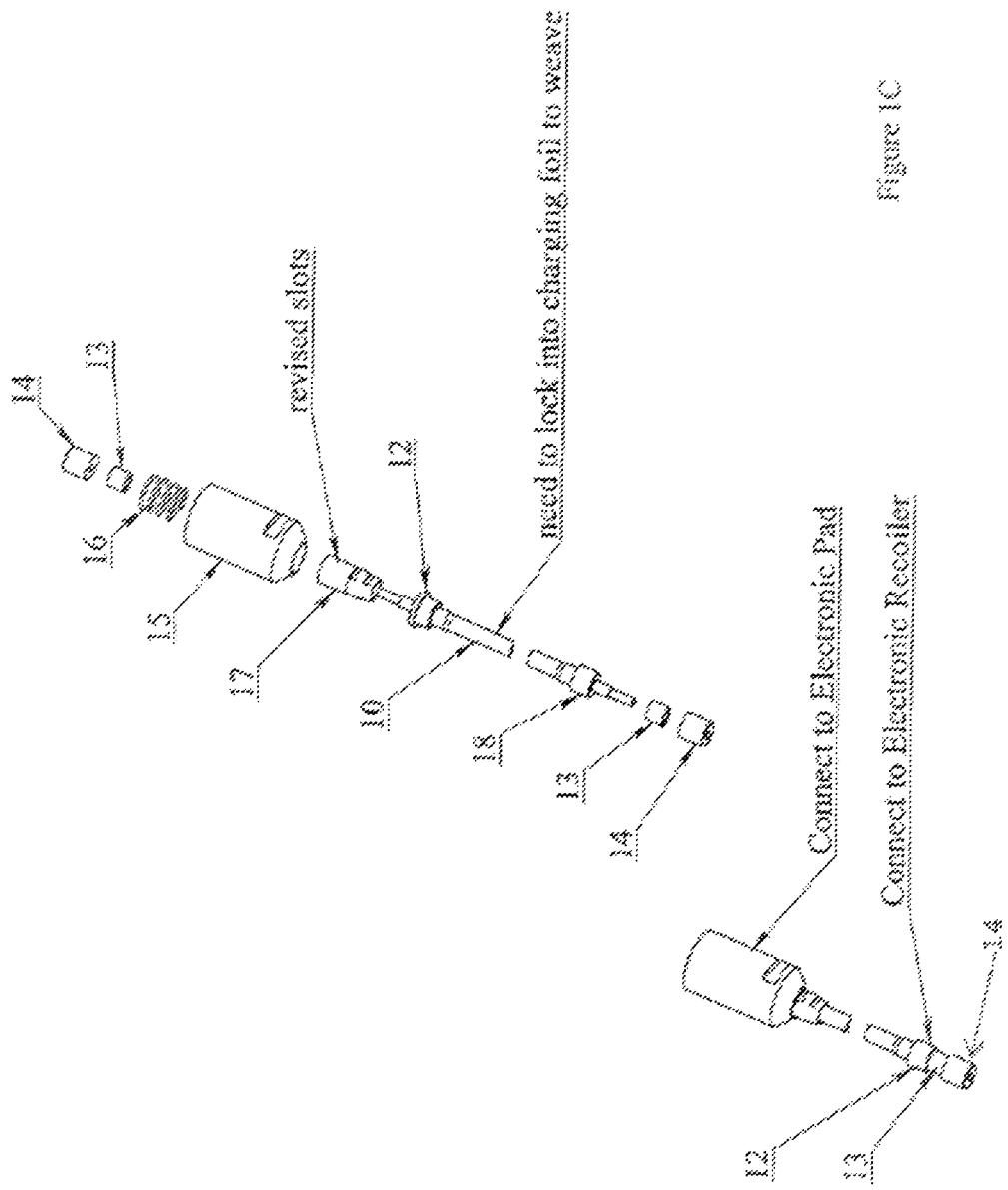

(charger circuit)

MODULAR HAND-HELD ELECTRONIC DEVICE CHARGING AND MONITORING SYSTEM

RELATED APPLICATIONS

This is the U.S. national stage application which priority under 35 U.S.C. §371 to International Patent Application No.: PCT/CA2010/000627 filed on Apr. 23, 2010, which claims priority to Canadian Patent Application No. 2,664,237 filed Apr. 27, 2009, the disclosures of which are incorporated by reference herein their entireties.

FIELD OF THE INVENTION

This specification relates to a charging, securing and monitoring system for hand-held electronic devices such as cell phones, BlackBerry's, PDA's, cameras, or the like and the components therefore. More particularly the teachings herein include a coaxial cable construction that permits securing and charging of said hand-held devices which are on display at a typical retailer. Further the cable may be accumulated on a unique recoiler assembly at one end of the coaxial cable and engages a unique holding device proximate the other end thereof.

BACKGROUND OF THE INVENTION

In order to properly market battery operated hand-held devices it is necessary to allow for the consumer to not only observe the device being considered for purchase but also to hold, handle and even operate that device. Examples of such devices that are typically marketed in electronic stores include cameras, phones, MP3 players, PDA's such as BlackBerry's, and global position system units or the like. It is necessary to display the unit predominantly so that the consumer can easily access and investigate the features of each hand-held device being considered for purchase. At the same time, the retail outlet requires that the displayed devices be also secured to prevent theft of the unit.

It is known in the art to provide such devices for displaying and securing of the units. Examples of these systems are found in the prior art namely, for example, U.S. patent application Ser. No. 11/708,243 to Rabinowitz et al., which provides a teaching of the display of a hand-held unit and the monitoring of the status of the unit using a tether for controlling the motion of a hand-held unit, for continuously recharging the battery operated unit, and at the same time for delivering product information about the device selected by a potential customer. Each tether has two electrically conductive metal cables of stainless-steel but also use of coaxial cables is contemplated. The construction of such a coaxial cable however is never described.

U.S. Pat. No. 7,403,117 to Leyden et al., teaches a security system for hand-held devices wherein the portable articles are attached to a tether having a given length and with the portable device being movable relative to its home position and wherein the system signals and triggers any movement of the portable article. The tether used in this system is in the form of a flexible cord which accumulates on a reel and allows the unit being displayed to move between a home position and a paid out position. The system includes a switch that defines the two states of the system namely at the home position and at the paid out position. A spring is provided which engages a portion of the switch to change the switch from the first state to the second state. An alarm may be generated as a result of the system going to the second state.

U.S. Pat. No. 6,027,277 also to Leyden et al., describes a security assembly for monitoring an article which includes a flexible tether including two electrical conductors which define first and second conductive paths for the tether. One of the ends of the tether includes an enlargement 80 being substantially cylindrical in form which may be inserted in the cavity or pocket 82. A conductive element 90 is also provided wrapped around the tether cable. This teaching contemplates the use of strictly mechanical, electrical, or combination of electrical/mechanical monitoring.

U.S. Pat. No. 5,552,771 also now U.S. Reissue Pat. No. RE37,590 to Leyden et al., teaches in FIG. 7 an alarm system which cooperates with a retractable sensor seen in FIG. 4 including a multiconductor cable engaged with the splitter box 202 which can control up to six sensors as best seen in FIG. 9 so that the splitter box can be daisy-chained to add additional sensors as well.

U.S. patent application Ser. No. 11/112,386 also to Leyden et al., teaches a security system for a portable article including a tether having a predetermined length which allows movement of the article within a confined movement relative to the initial position of the unit. The security system includes a response that is triggered as the portable article is repositioned and the flexible cord is drawn from a spool which includes a switch to indicate the change of state of the system. In this manner the state of the system may be monitored and in fact displayed.

U.S. Pat. No. 7,081,822 teaches as best seen in FIG. 12 a conductive element for a product display system which includes wires which are concentric and which include insulating layers thereby providing a unitary cord assembly. The tether of the reference includes a mechanical cable as well as an electrical conductor. The mechanical aspect of the cable is provided to resist severance of the tether.

Finally, U.S. Pat. No. 5,107,076 to Bullock et al., teaches an easily strippable composite dielectric coaxial signal cable. As best seen in the Figures this coaxial signal cable includes a solid or stranded metal center surrounded by a second continuous dielectric layer and may be further wrapped with a metal-plated or metallized polymer tape, such as aluminized tape which is preferred. The metals of the conductors, for example the drain wire and the outer conductor may be selected from the group consisting of copper, metal-plated copper, copper alloys, and aluminum.

These above-mentioned references represent the closest prior art known to the Applicant which relate directly to the teachings which went before the present invention.

In spite of the many systems that are available in the prior art nowhere within the prior art is there taught a compact and robust system for displaying, securing and charging hand-held battery operated devices in standardized format which provides for positive engagement and powering of the security system.

It is therefore a primary objective of this invention to obviate the deficiencies in the prior art by providing a display system which is robust and provides both mechanical and electrical security for the hand-held devices being displayed.

It is yet a further objective of the invention to provide a coaxial cable assembly manufactured from strong robust coaxial cable as a conductor including at the ends thereof connectors to both the mounting device for the hand-held unit proximate one end and to a reel system proximate the other end.

According to yet another objective of the invention there is provided a coaxial cable which may be used to secure and charge the hand-held devices being displayed in a security system.

It is yet a further objective of the invention to provide a unique reel assembly which includes a compact module for charging the hand-held unit being displayed through the cable and also through the reel assembly.

It is yet a further objective of the invention to power each reel used for securing and charging each device being displayed in connecting said reel to a router module which is the source of power.

According to yet another objective of the invention there is provided a control router system which provides power to a multiplicity of hand-held devices through the unique coaxial cable disposed on a reel.

It is yet a further objective of the invention to provide within said reel assembly a flat coil spring disposed within a spring module which may be inserted into the center of the reel assembly adjacent the hub and thereby provides the resilient biasing of the system.

It is a further objective of the invention to provide a unique mounting pad for securing and charging the hand-held device.

In yet another objective of the invention a module is provided to power the hub with the recoiler assembly in a unique manner which is also used along with compatible and cooperating elements within both devices to monitor the status of the system.

Further and other objectives of the invention will become apparent to those skilled in the art when considering the following summary of the invention and the more detailed description of the preferred embodiments illustrated herein.

SUMMARY OF THE INVENTION

According to one aspect of the invention there is provided a coaxial cable construction comprising a conductive core (preferably made up of seven bundles including seven steel strands for each bundle, each strand most preferably being individually tin plated or otherwise prepared so as to enhance the conductivity of each bundle), said core being covered with a non-conducting coating of insulation such as PVC or the like, preferably said coating having disposed thereupon a secondary conducting path and preferably intertwined copper strands or more preferably braided copper strands, preferably said secondary path being wrapped under conducting foil with a plastic film laminated on the exterior thereof, each end of the cable having disposed thereat; a retaining conducting part fixed, preferably swagged on said core and preferably being copper, an insulating part separating a foil engaging part, preferably bronze, from said retaining part, said retaining part, foil engaging part and insulating part being fixed in position at each end of said cable. The core might also be made of spring steel. The cable is less susceptible to twisting and becoming knotted because of a security nut located at the end of the cable adjacent the hand-held device which allows free rotation of the cable within the nut at that end thereby minimizing twisting and knotting.

According to yet another aspect of the invention there is provided a recoiler assembly comprising the cable construction described in the preceding paragraph, said recoiler assembly also including a reel assembly for accumulating a predetermined length of said cable, the reel including a housing and a spool having a spring biased hub upon which the cable is accumulated and payed out, all parts preferably being made from plastic material, preferably said hub having a cut out proximate the interior thereof to connect one end of the cable proximate the retainer thereof, with the free end of the cable extending from the recoiler assembly and being engageable with a preferred mounting pad for a hand-held device, said end of the retainer proximate the interior of the hub for connecting with a conducting element extending through the hub and for providing current to the cable through said hub. The conducting element if not used with the recoiler module may act as a switch to close the current thru to the circuit. The recoiler module is described below.

In a preferred embodiment there is provided a recoiler assembly comprising a reel assembly for accumulating a predetermined length of cable, the reel including a housing and a spool having a spring biased hub upon which the cable is accumulated and payed out, all parts preferably being made from plastic material, said hub having a cut out proximate the interior thereof to connect one end of the cable proximate the retainer thereof, with the free end of the cable extending from the recoiler assembly and being engageable with a preferred mounting pad for a hand-held device, said end of the cable proximate the interior of the hub for connecting with a conducting element extending through the hub and for providing current to the cable through said hub.

According to yet another aspect of the invention the center of the hub of said recoiler assembly has mounted therein an electrically conducting part that engages with a power supply cord and preferably a telephone style cable or the like through a recoiler module for providing current to the center of the hub of the recoiler assembly and through to the coaxial cable through the conducting portions thereof to the preferred mounting pad on the hand-held assembly for both charging the hand-held device and also for securing it, said coaxial cable being sufficiently robust to withstand a predetermined force needed for cutting said cable so as to secure the hand-held device in place. In another embodiment the recoiler assembly further comprises a magnet which engages a reed switch provided with the recoiler module to identify when the handheld device is moved from a home position.

Preferably said mounting pad further comprising a coaxial cable receiving portion to engage with the free end of said coaxial cable and thereby secure and charge said handheld device. Said receiving portion including a hollow threaded fitting surrounding a spring biased contact pin, preferably copper, which extends into said mounting pad which includes a circuit to provide power to the handheld device in order to charge the hand held device, preferably a USB cable or the like extending from said pad. The mounting pad may be fixed to the handheld device by a tape pad or alternatively a clamping device and when fixed activates switches provided with said mounting pad to enable charging. In one embodiment said circuit further comprises an LED and a resistor which is monitored by a controller or router to determine the status of the device.

A by-pass circuit provided in each pad (labelled B in FIG. 10) provides for the continuous monitoring of the charging circuit for each device throughout the system.

According to yet another aspect of the invention there is provided a charging router suitable for charging a multiplicity of hand held devices (preferably up to 10), for example using the abovementioned components, thereby providing the charging status and an alarm if the device is no longer sensed (recognized when the charging circuit has been broken). The router comprising; a power supply, an alarm circuit, separate charging circuits suitable to charge the hand-held devices being secured by said router, at least one programmable logic chip to monitor the status of each charging circuit and to initiate an alarm when warranted, said router being adaptable for connection to a separate computer such as a PC or network, said router preferably including a reset button which may also be reset via an optional remote such as an RF device. The logic contained within said router further comprises programmed compensating factors to avoid false alarms such as lagging and leading response times or the like.

According to yet another aspect of the invention there is provided a mounting pad suitable for use with a hand-held device such as cell phones, MP3 Players, games or the like, said mounting pad including a threaded hollow post containing therein a contact pin preferably copper for a coaxial cable or other tethering device to secure and charge the hand-held device, said contact extending through to the interior of the pad so as to engage a charging circuit, for example that which is observed in relation to FIGS. 9 and 10 and including an LED and a resistor in one embodiment, said pad including a mounting device to the hand-held device, such as a mounting tape pad, said mounting pad being secured via the threaded post to a nut portion, in a preferred embodiment threaded and engaged with the cable or tether, which provides for the swivelling of the cable and thereby preventing knotting thereof in use. The essence therefore of the mounting pad feature is the ability to swivel and yet still be connected and electrically in communication with the tether or cable used to supply power to the pad. A circuit such as that described above would also include a connection to the power inlet for the hand-held device and that particular connection may be of any standard form including USB and standard round ended parts used for older cell phones.

According to yet another aspect of the invention there is provided a spring module suitable for being incorporated in a recoiler, said spring module having a flat coil spring contained therein, said spring having two ends and having proximate the center thereof a tab portion which engages adjacent the hub of a recoiler and wherein the other end has a tab portion which engages a portion of the spool through the spring module, preferably the spring module is in a cassette form and is easily inserted into the assembly for a recoiler providing the necessary spring biasing of the recoiler to return from a payed out position to a home position when used, for example in conjunction with a system to display hand-held devices. The spring will therefore coil and uncoil as the recoiler spool rotates.

In one embodiment the router assembly contains a by-pass circuit within the mounting pad and should that circuit be broken then an alarm will sound. A separate alarm circuit is not provided within the system of the present invention and that feature is accomplished by the provision of the secondary by-pass circuit contained and illustrated within FIGS. 9 and 10.

In another embodiment the mounting pad may be either as illustrated in FIG. 8 or as illustrated as in FIG. 11. Specifically in FIG. 11 the hollow post 112 includes proximate the bottom thereof four stops which engage with compatible stops within the bottom portion of the pad 111 which secures that feature in place.

BRIEF DESCRIPTION OF THE DRAWINGS

FIGS. 1A and 1B are schematic illustrations of the components of the preferred embodiments of the invention.

FIG. 1C is an exploded perspective view of the construction of a coaxial cable illustrated in a preferred embodiment of the invention.

DETAILED DESCRIPTION OF THE PREFERRED EMBODIMENTS

Figure 1B:
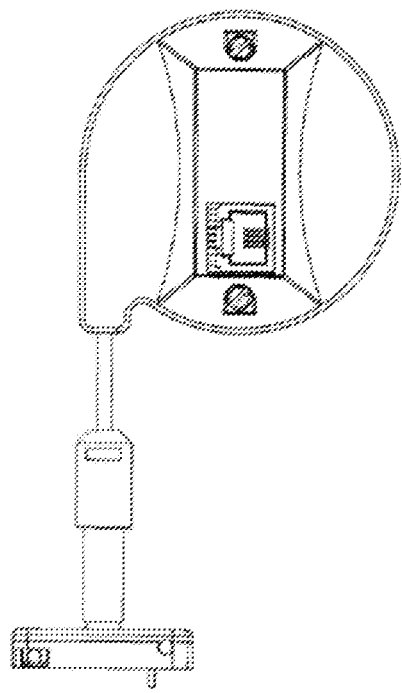
Figure 1B:
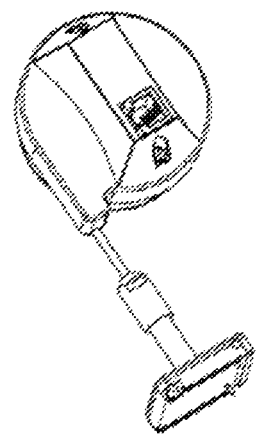
Figure 8:
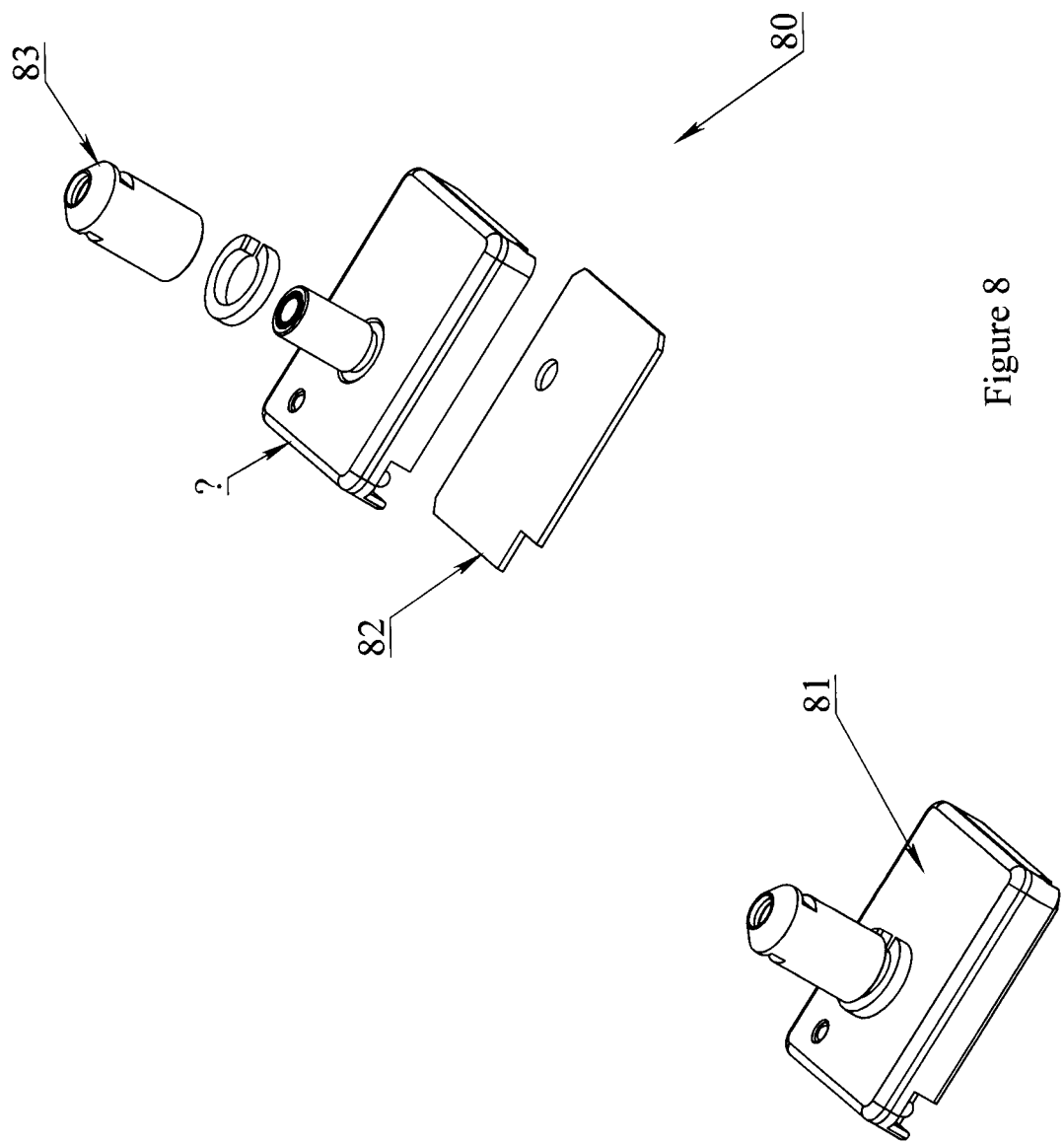
FIG. 8 is an exploded perspective view of a mounting pad for a hand held device illustrated in a preferred embodiment of the invention.

Referring generally to the figures and specifically to FIGS. 1A and 1B there is illustrated a charging and monitoring system for hand-held electronic devices. This system includes a coaxial cable 10 and the construction thereof as best seen in FIG. 1C, a recoiler construction 5 best seen in FIG. 2, a recoiler power module 60 best seen in relation to FIG. 6 to provide power to the cable proximate the end indicated as being connected to the electronic recoiler in FIG. 16 and a charging pad 30 as best seen in FIG. 8. These devices are all interconnected and are powered through the alarm charge module or router seen in FIG. 12 which includes up to ten outlets, 1-10, connected normally by a jack or plug to supply power from said router P through said recoiler module of FIG. 6 through the hub of the recoiler reel 5 of FIG. 2 into the cable as seen in FIG. 2 proximate the hub thereof and down to the free end attached to the charging pad 80 as seen in FIG. 8 which retains and secures the hand-held device. It is to this unique distribution of power from said router module to the hand-held device as summarized in FIGS. 1A and 1B, and the unique components of the present system that are considered by Applicant to be inventive. None of the prior art devices include such a combination and in fact although coaxial cable is well known the specific composition of the coaxial cable illustrated in FIG. 1C is heretofore unknown.

Figure 5:
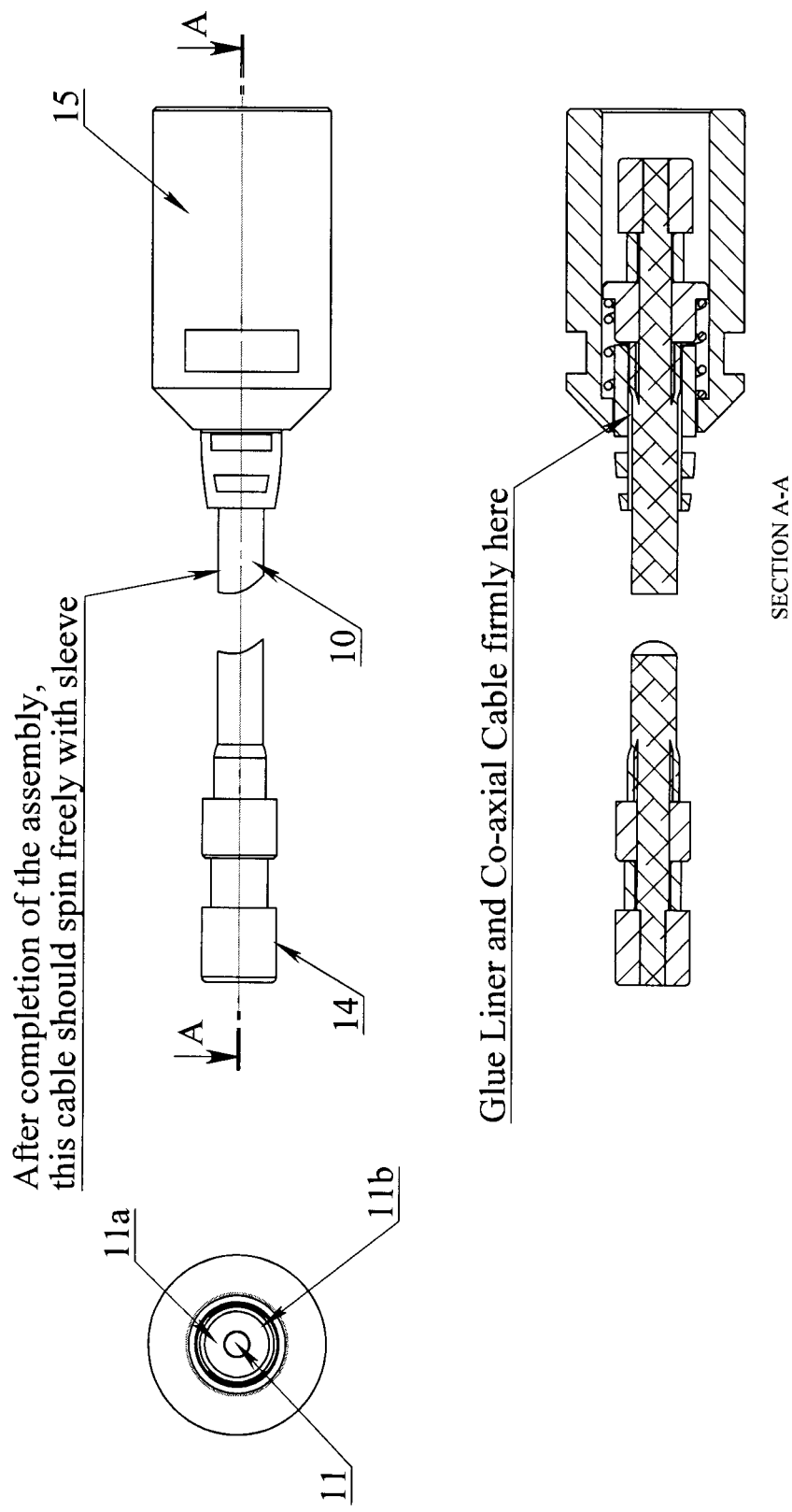
FIG. 5 is a cutaway side view of the retaining contact of FIG. 1C disposed at each end of said coaxial cable and illustrated in a preferred embodiment of the invention.

Referring now to FIG. 1C there is provided a coaxial cable 10 which includes as best seen in FIG. 5 a conductive core 11 which is made up of seven bundles of seven strands of steel, each bundle being made of seven strands of steel wire which has been tin plated as seen in FIG. 5. Each end of said cable 10 includes a copper retaining contact 14 which is swagged onto the end of the core. The end also includes an insulator 13 and a bronze fitting 12 adjacent thereto the use of which will be described hereinafter. The cable 10 includes the core 11 surrounded by a non-conducting insulating layer upon which is disposed braided copper strands around the insulating layer. Further conducting foil may be provided which covers the copper wires and is anchored by the bronze conductors 12 to the foil to complete the circuit.

Figure 11:
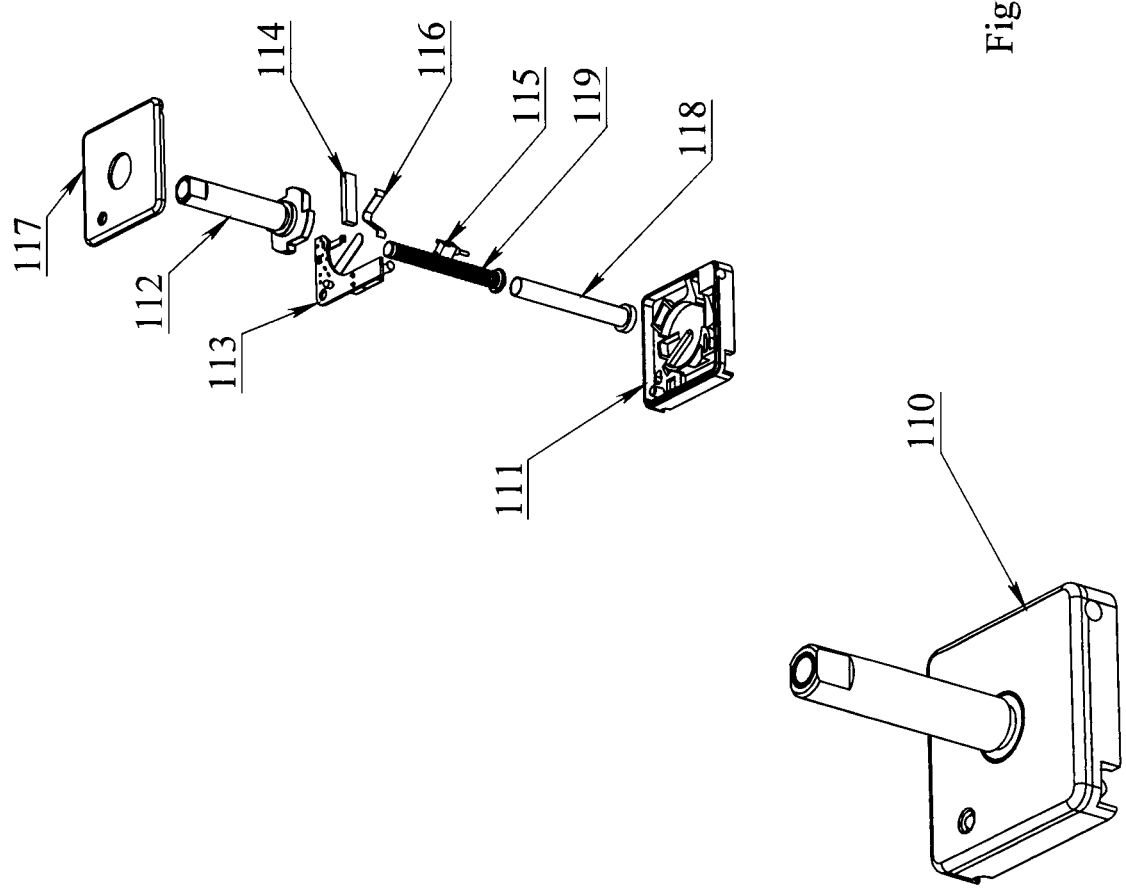
FIG. 11 is an alternative embodiment of the mounting pad of the present invention.

A security nut 15 is provided adjacent the end which will connect to the electronic pad proximate the post thereof as seen in FIG. 11. Threading the interior of security nut 15 will therefore be mounted onto the hollow post in FIG. 11 which is also threaded on the exterior thereof to ensure the security of the cable thereto. A spring biased conducting element is contained in said hollow of the post. However the cable is free to rotate within said security nut to avoid kinking and knotting of the cable. A liner or insulator is provided adjacent the end of the security nut 15 in order to ensure that the circuits carried through the core and the braided copper strands and/or conducting foil are separated properly with no short circuits being possible. A spring 16 is provided adjacent the end that is being fastened to the pad affixed to the mobile device to ensure that the connection to the post as seen in FIG. 11 engages the copper pin within said post and thus ensures a proper circuit connection.

Figure 2A:
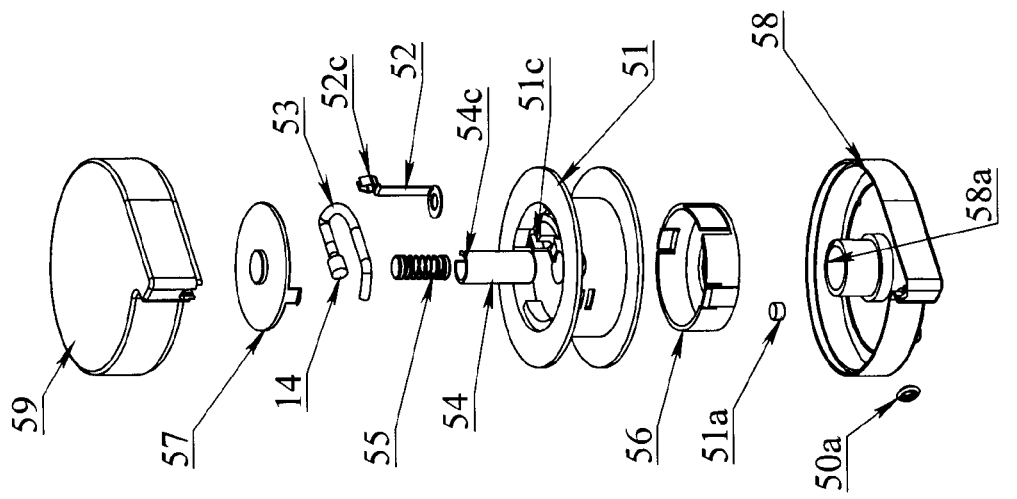
FIGS. 2A and 2B are exploded and perspective views of the construction of a recoiler assembly illustrated in a preferred embodiment of the invention.
Figure 2A:
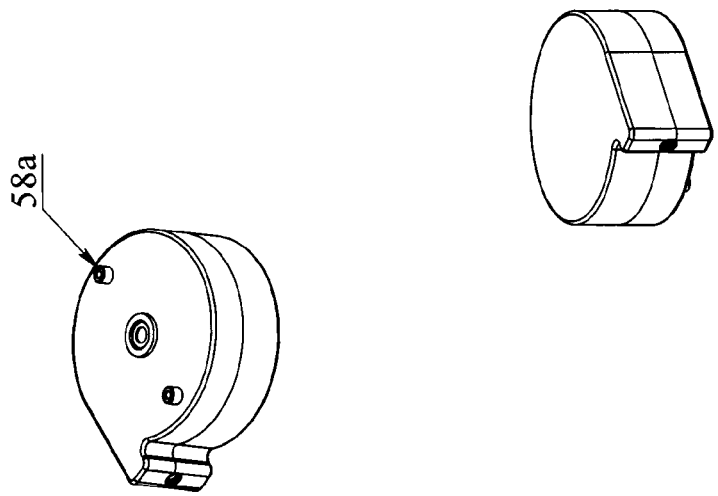
Figure 2B:
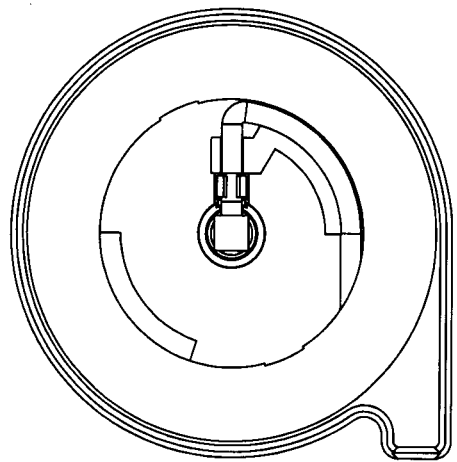
Figure 2B:
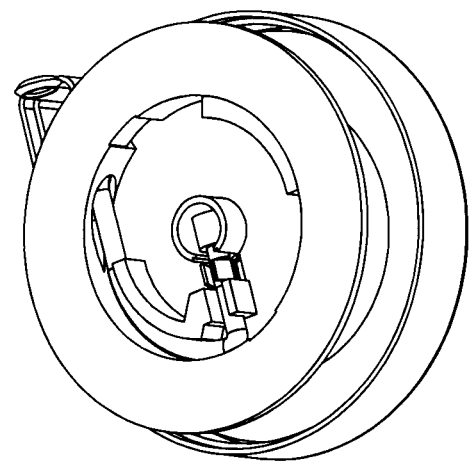
Figure 6:
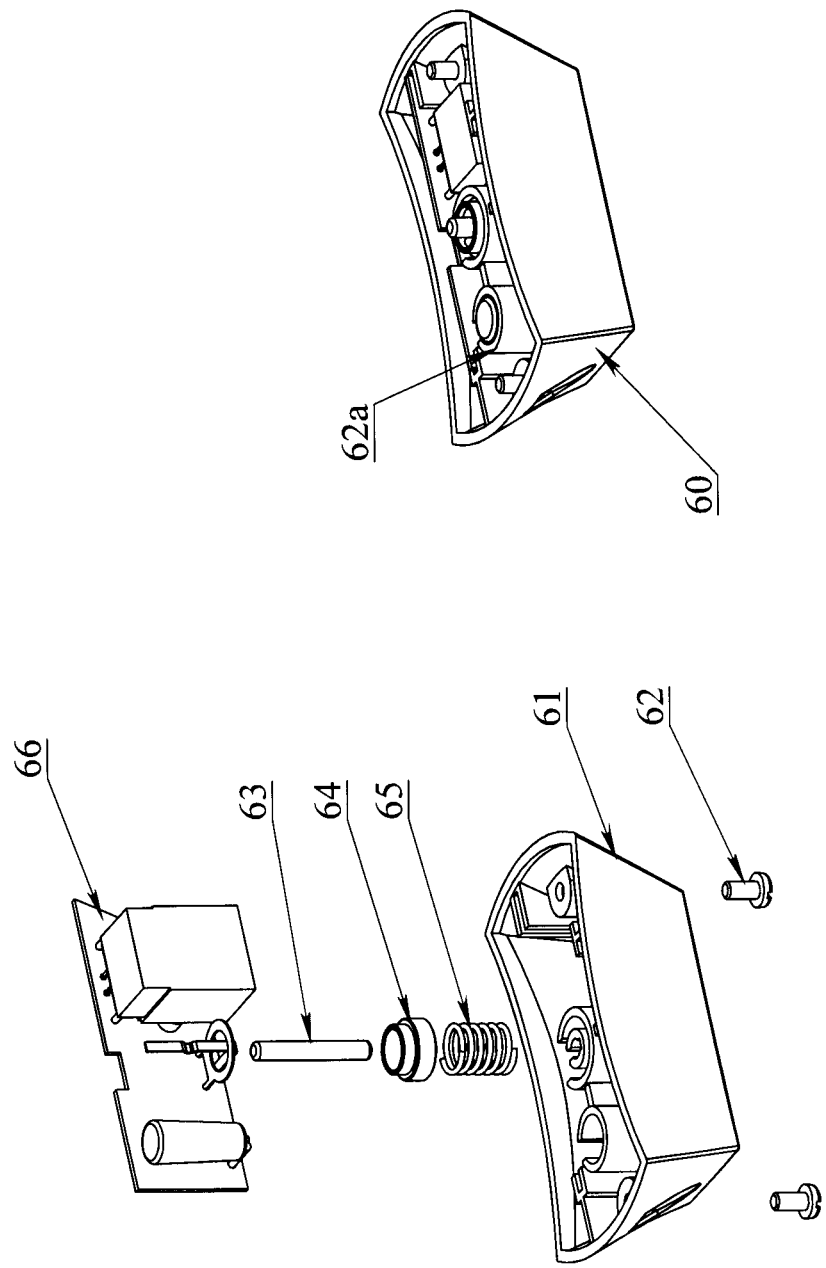
FIG. 6 is an exploded perspective view of the recoiler module which engages the recoiler assembly of FIG. 2 and illustrated in a preferred embodiment of the invention.

Referring now to FIGS. 2A and 2B there is illustrated the recoiler assembly 5 which includes a top part 59 and a bottom part 58 which houses the spool of the recoiler 51. The spool 51 includes extended there through an insulator 54 which contains in use a inner conductor part 55 and a outer conductor part 52 which connects through the cable 53 proximate the end thereof 14 which contacts the conductor 55 and the outer conductor 52 to create a circuit as these conductors extend down through a lower portion 58 through the opening therein 58a extending to the recoiler module of FIG. 6 which essentially provides the power distributed by the router assembly as seen in FIG. 12. The end 14 of said cable engages a cut out or pocket 51a within the spool 51 through which the insulator 54 passes. The groove or further cut out 54a in said insulator provides a space for end 14 to rest. The cable is also secured in a guide as best seen in FIG. 2B. The outer conductor 52 proximate the notch 52a clips against the bronze conductor not shown in FIG. 2 but shown in FIG. 1C as item 13, to complete the circuit from the outer and inner conductors. These elements engage until the recoiler module of FIG. 6 is engaged with the recoiler so as to space elements 52 and 54 when pressed by contactor 64. The power module therefore provides power through the hub which will be explained in relation to FIG. 6 to allow the mounting unit for the hand-held appliance to be charged and secured in this unique fashion.

Figure 3:
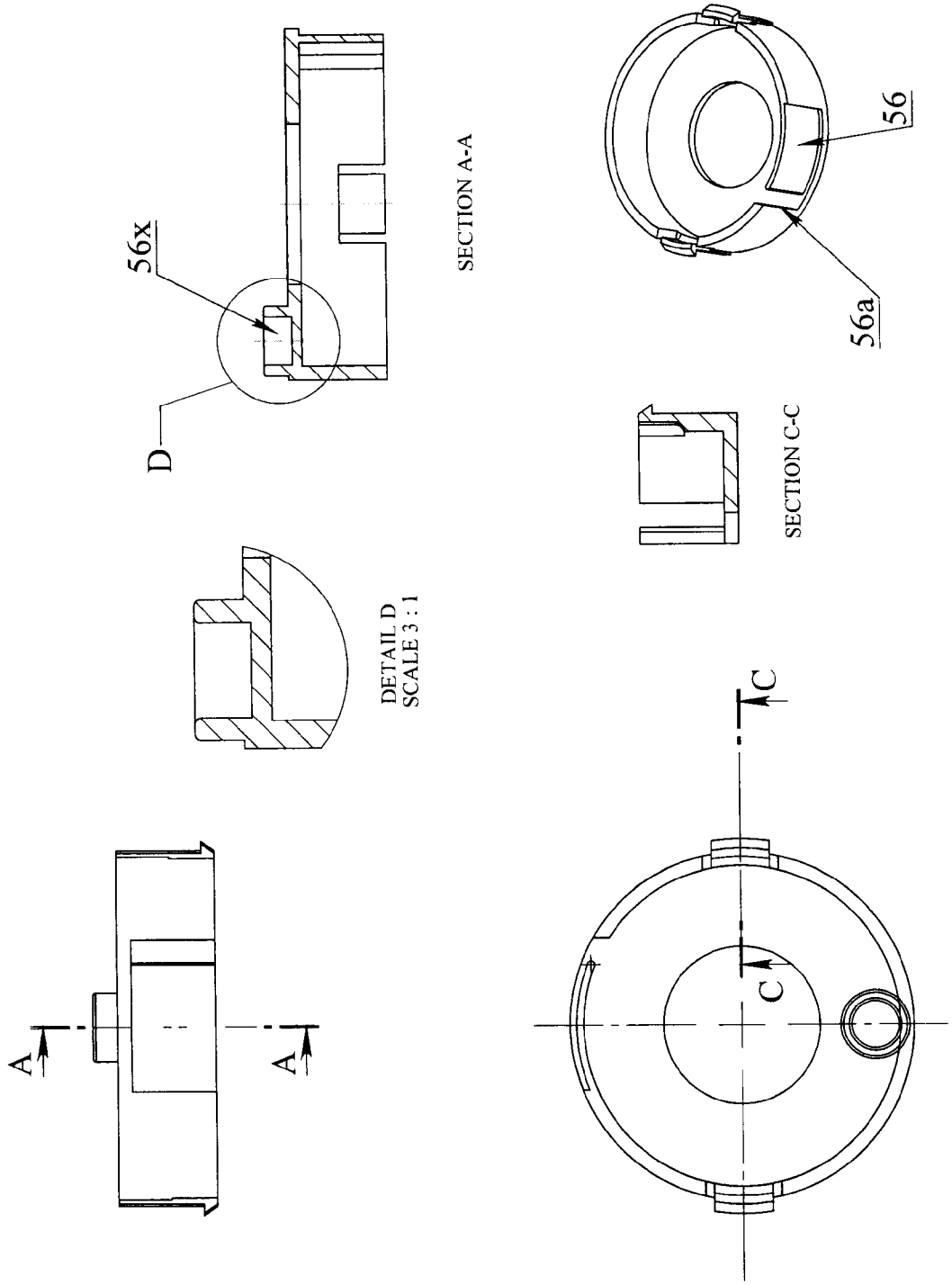
FIG. 3 is a perspective view of the construction of a spring retaining disk included in the recoiler assembly of FIG. 2 and illustrated in a preferred embodiment of the invention.
Figure 7:
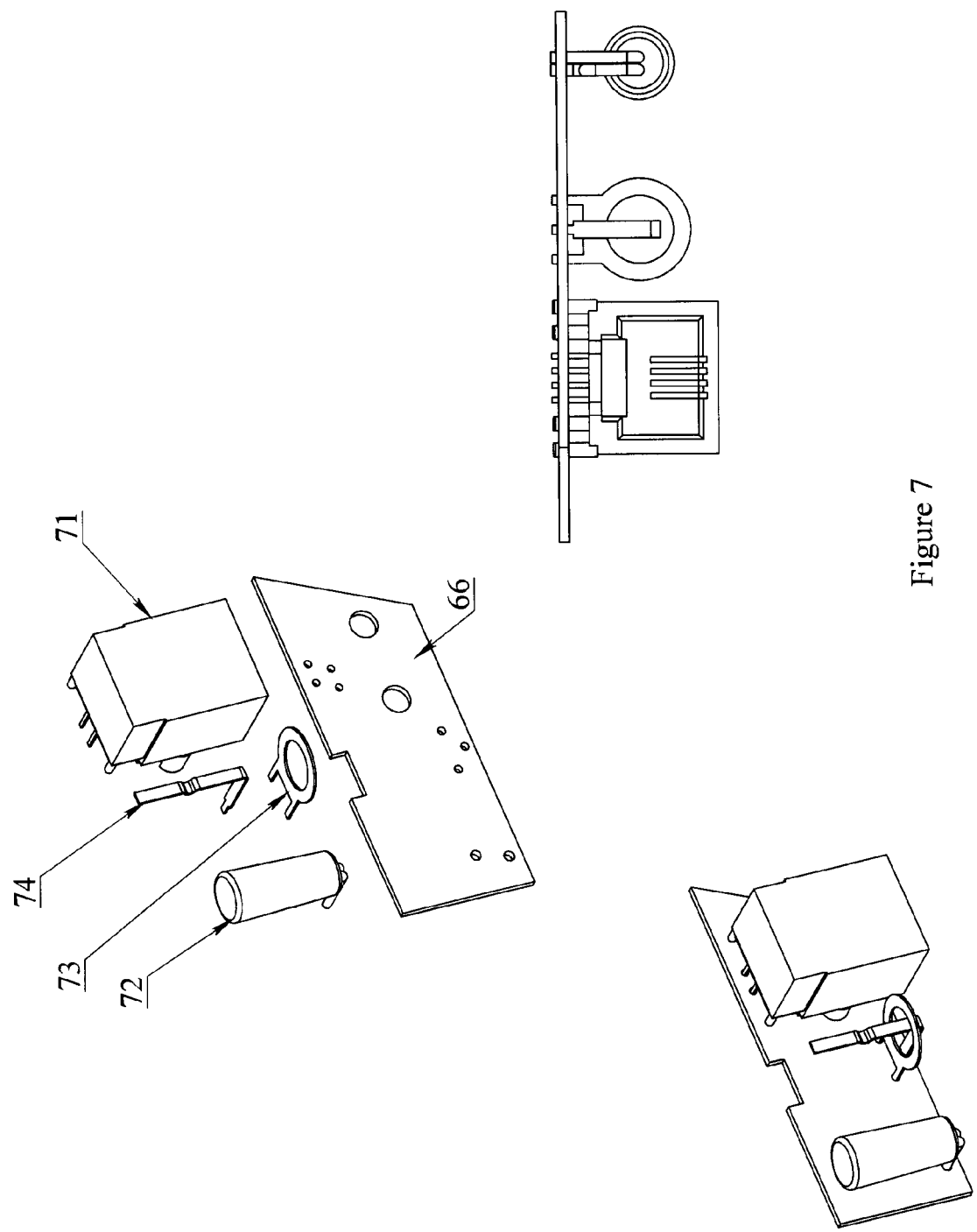
FIG. 7 is an exploded view of the components of FIG. 6 illustrated in a preferred embodiment of the invention.

A spring holder 56 is provided which contains in use a coiled metal spring, which is not shown, which conveniently fits within said spring holder with the one end of the leaf spring extending on the exterior of said spring holder for engaging the spool, and the other end being fully contained within the spring holder and contacting adjacent the hub. This provides the resilient biasing for the recoiler assembly when fully assembled. A sufficient amount of cable is provided on said recoiler 5 to allow for the hand-held device to be moved from the home position to a viewing position by a customer and at the same time provides comfort for the customer to easily access the unit without an extensive amount of force tending to move the hand-held device back to the home position. The spring holder 56 is seen best in FIG. 3 illustrating the detail thereof. Said spring holder 56 also includes a cutout at the perimeter thereof 56a which provides for the outer portion of the leaf spring and a hook part thereof to extend through said cut out 56a and thereby engage said spool 51 as it rotates. The other end of the spring may be attached in a similar manner adjacent the hub of the recoiler. The spring holder 56 also has proximate one side thereof a little pocket 56x to accommodate a magnet which will rotate when said recoiler rotates and which in fact will engage a magnetic switch which will be described with respect to the recoiler module to provide a signal as best seen in FIG. 7 to activate the logic within the router module to generate a signal that the unit has moved from the home to the viewing position or whatever message is required.

Figure 4:
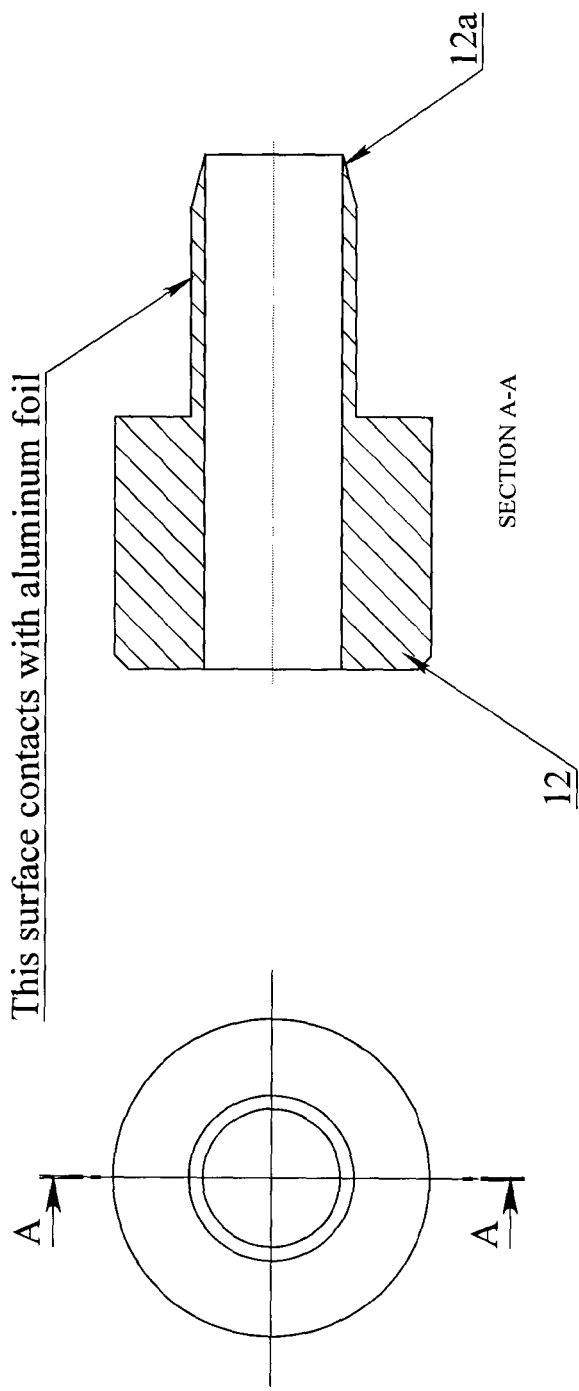
FIG. 4 is a cutaway side view of the bronze pin of FIG. 1C connected to the aluminum covering of said coaxial cable and illustrated in a preferred embodiment of the invention.
Figure 4:
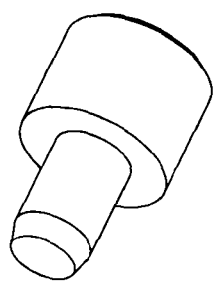

FIG. 4 illustrates the stop 12 which is a conductor preferably made of bronze or copper which engages the foil part proximate the portion of diminished diameter 12a with the foil extending upon the surface thereof as illustrated.

FIG. 5 illustrates a closer view of the ends of the cable 10 illustrating the interior parts thereof and having at one end the nut 15 for engaging with a hand-held mounting pad seen in FIGS. 8 and 11 and for securing proximate the other end thereof adjacent the nut 14 to the recoiling assembly previously described. The cable 10 includes a core 11 which is contained within an insulating portion 11a and having further contained thereupon braided copper strands or a foil layer that is laminated 11b to complete the structure of the coaxial cable 10.

Referring now to FIG. 6 there is illustrated a recoiler module 60 through which contactors 63 and 64 are spring biased via module spring 65 to engage the connector 14 of said coaxial cable 10, previously described, wherein said module provides power when connected, via screws 62, to the exterior of the recoiler to allow power from the connector 66 connected to a telephone cable or the like as seen in FIG. 12 to provide distributed power from said router shown in FIG. 12 to said recoiler module of FIG. 6. A housing 61 therefore is provided which contains the circuit board 66 as seen in FIG. 7 and further includes within a pocket portion 62a said magnetic switch 72 which would come in close contact with the magnetic portion contained with the pocket 56x of FIG. 3. This interior engagement provides for the alarming and understanding by the system as to the position of the recoiler assembly. An outer and an inner contactor are provided to complete the circuit. The recoiler module may be held in position on the exterior of the recoiler by screws 62 or with the contemplated cooperative detents provided, which are not shown in FIG. 6 or in FIG. 7.

Figure 9:
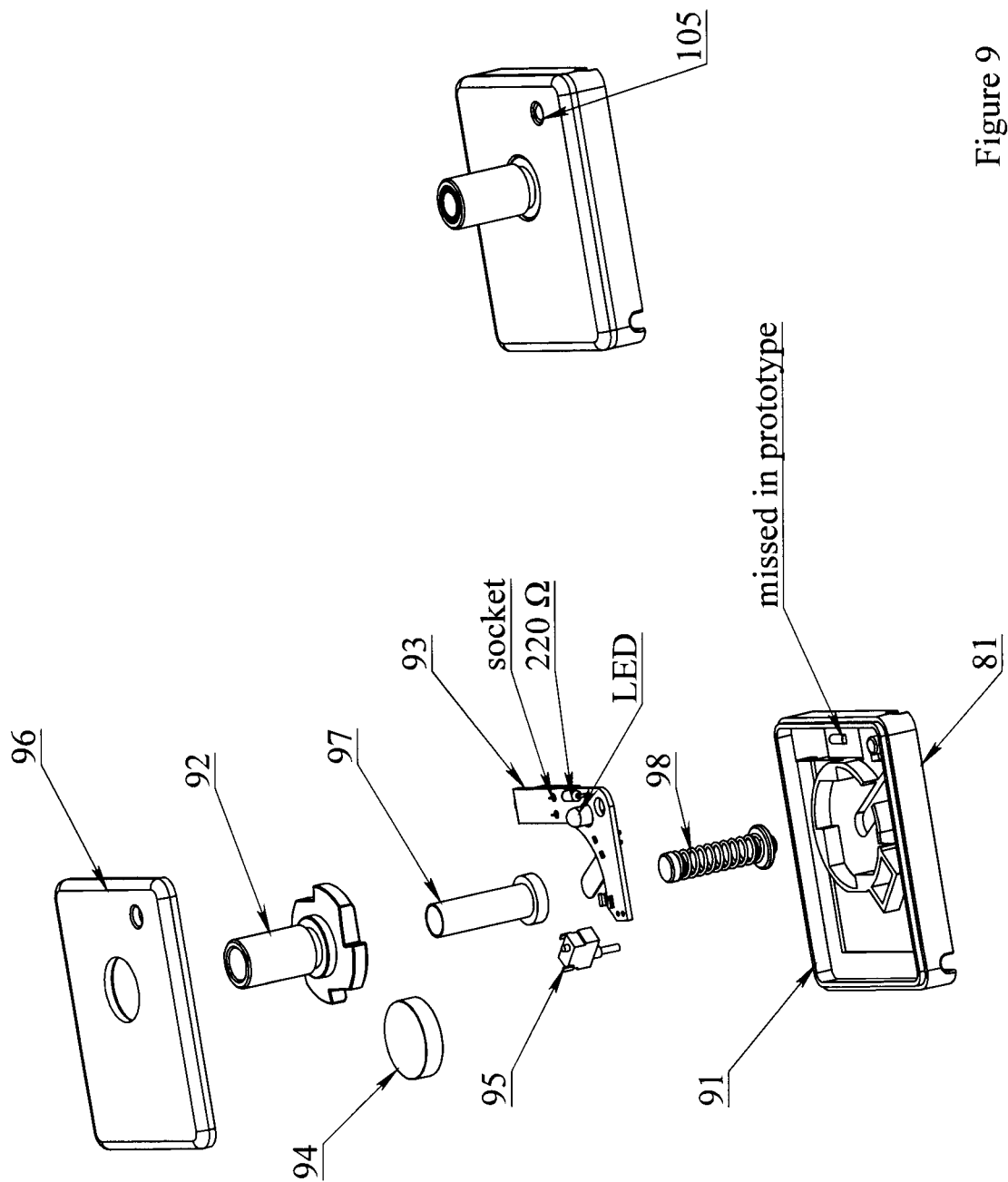
FIG. 9 is an exploded perspective view of the components of the charging components of the mounting pad of FIG. 8 and illustrated in a preferred embodiment of the invention.
Figure 10:
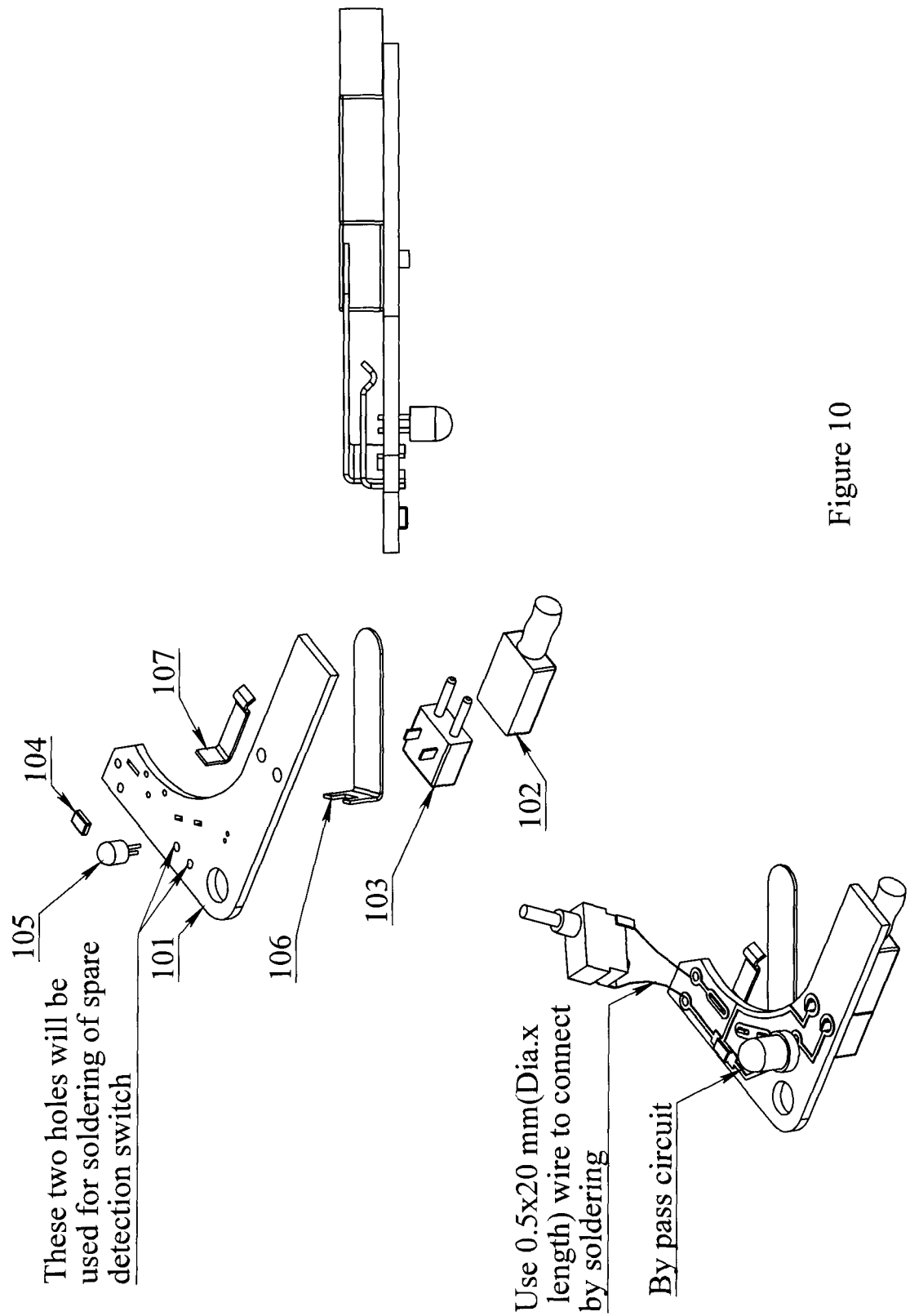
FIG. 10 is an exploded view of the PCB of the mounting pad of FIGS. 8 and 9 and illustrated in a preferred embodiment of the invention.

In FIG. 8 there is illustrating a mounting pad for a hand-held device which connects via the security nut 83 to the coaxial cable 10 of FIG. 1C and to the hand-held device via the pad tape 82. Further the components may also be seen in FIG. 9 for the charge pad 81 which illustrates all of the components contained within said pad to allow for proper charging and monitoring of the hand-held device including the spring post conductor 98 extending through the post 92 to contact the electrical nut 14, as shown in FIG. 1C, and being secured thereto. A circuit board 93 includes all of the elements to ensure proper passage of power through to the hand-held device as best seen in FIG. 10, which includes a circuit board 101, the jack portion 102, plug 103, resistance item 104, LED 105, conductor in the center 106 and a conductor on the side 107 which are also seen in section and used in conjunction with the assembly of FIG. 9 to provide power. A similar construction is shown in FIG. 11 of a post assembly shown in an alternative embodiment of the invention and includes a printed circuit board 113 in a similar manner. A key aspect of the monitoring system is that a by-pass circuit B best seen in FIG. 10, will be included in FIG. 11 as well. It is this circuit formed between the LED and resistor 104 as seen in FIG. 10 that is monitored by the overall system. Specifically the switch 91 seen in FIG. 9 passes through the top cover and is actuated when a hand held device is engaged. This action completes and closes the circuit for charging and monitoring purposes.

Referring again to FIG. 10 the center conductor and the side conductor are activated in conjunction with the operation of the switch 95 which engages the conductors 106 and 107 shown in FIG. 10. The same function is true for the structure of FIG. 11. The LED 105 is provided to show that the system is operational. The LED extends through a portion of the assembly as best seen in FIG. 9. Referring to FIG. 11 a separate charging module 110 is illustrated which includes the components including a back cover 111, a top cover 117 which when exploded includes a ratchet post 112, a printed circuit board 113 similar to that previously described in FIG. 9, a ratchet stop 114, a switch 115, a ratchet spring 116, plastic sleeve 118 and a post conductor 119 to connect to the nut 14 proximate the end of the coaxial cable. Otherwise the unit works similar to that which is described in relation to FIG. 9. A by-pass circuit is also provided in each pad (labelled B in FIG. 10) which provides for the continuous monitoring of the charging circuit for each device throughout the system.

Figure 12A:
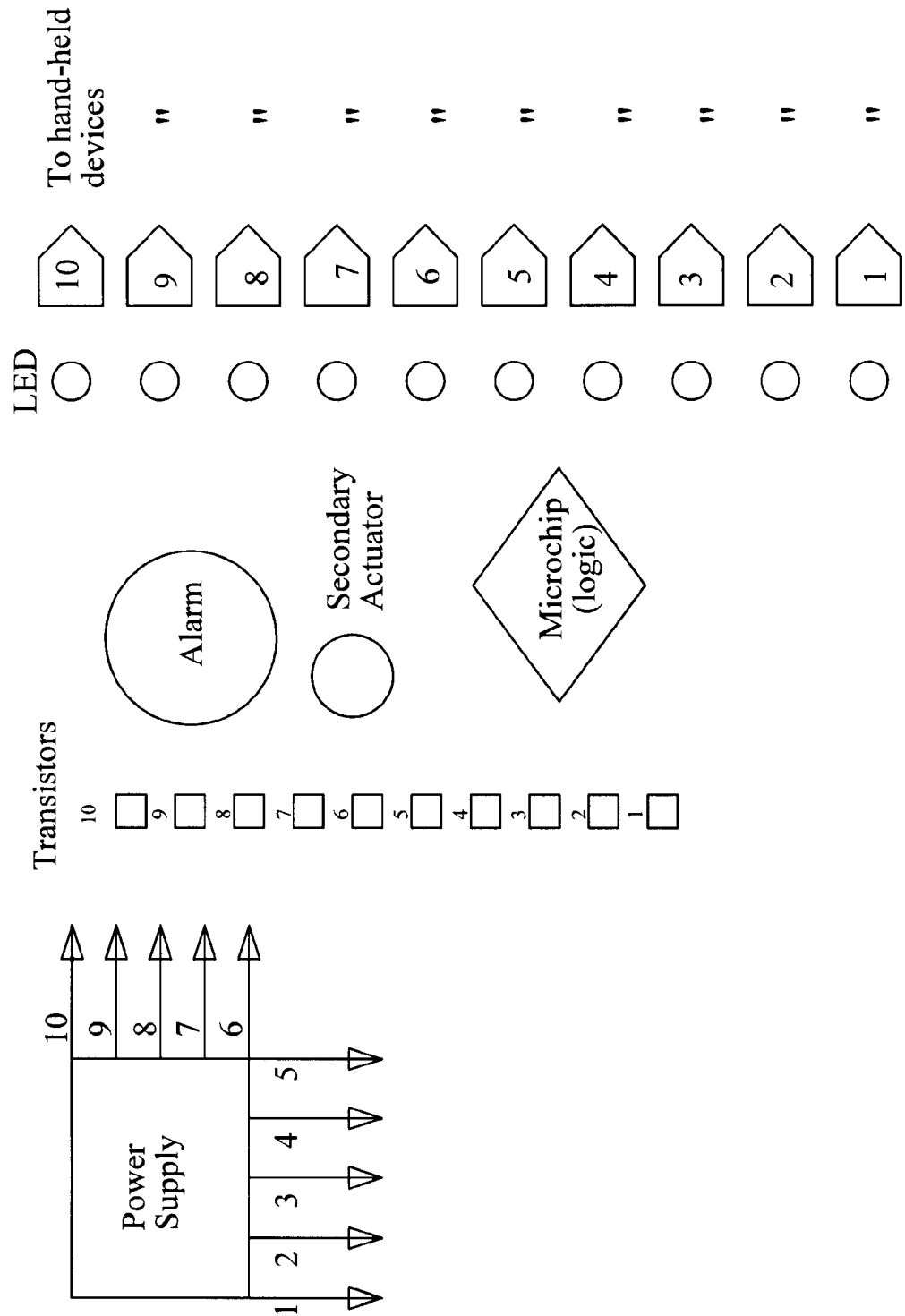
FIGS. 12A and 12B are schematics illustrating the components of the charging router of the present invention.
Figure 12B:
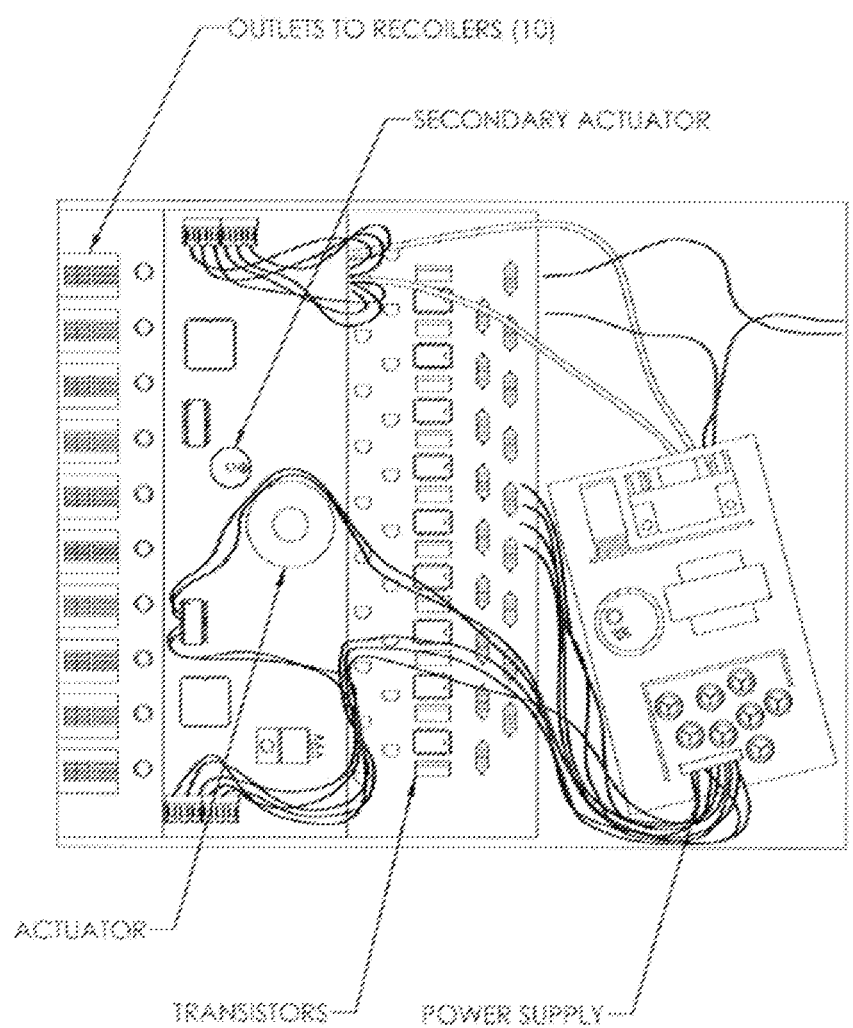

Referring now to FIGS. 12A and 12B there is illustrated a schematic of the router module used to distribute power from a power supply to a multitude of transistors for circuits 1 through 10 to the various outputs in jack form of a telephone style, through to the recoiler module as previously illustrated in relation to FIG. 6. An alarm is included within said router module and a secondary actuator or alarm is also included to indicate a secondary event. The primary alarm is used to indicate when a circuit is broken between the router and the hand-held device and the secondary alarm would be used for another event such as electrical or mechanical failures. The primary alarm preferably sounds when cutting of the cable begins when a short circuit is sensed. The router also includes at least one microchip and in this sense two which includes the logic to control the overall system, the logic of course is contained within a program and the logic for the program is illustrated in relation to FIG. 13.

Figure 13:
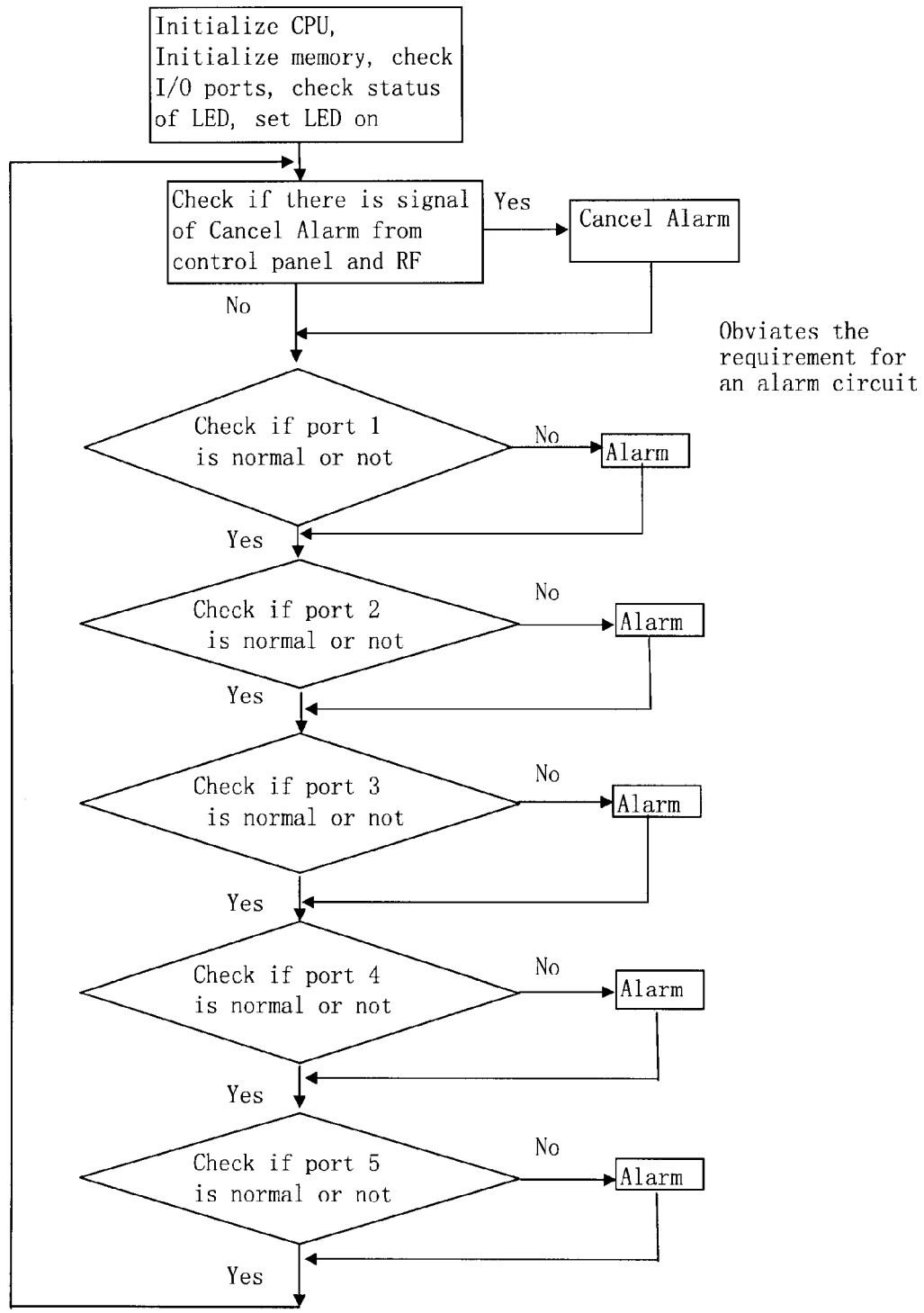
FIG. 13 is a flow chart of the logic the charging router uses for charging and securing the handheld devices contemplated with this invention.

Referring now to FIG. 13 there is illustrated a flowchart which includes the logic for the entire system and how and when the actuators will sound and what signals are being monitored and how and what events are considered to be of significance to sound the alarm, and to monitor what hand-held unit is being accessed so one can, for example, as is known in the art, display the hand-held devices being inspected by a potential customer and compare the features thereof by merely accessing the hand-held unit with the magnet switch contained with the recoiler module and the recoiler assembly engaging one another so as to provide a signal to the router module. The description in FIG. 13 is not repeated here.

Figure 14A:
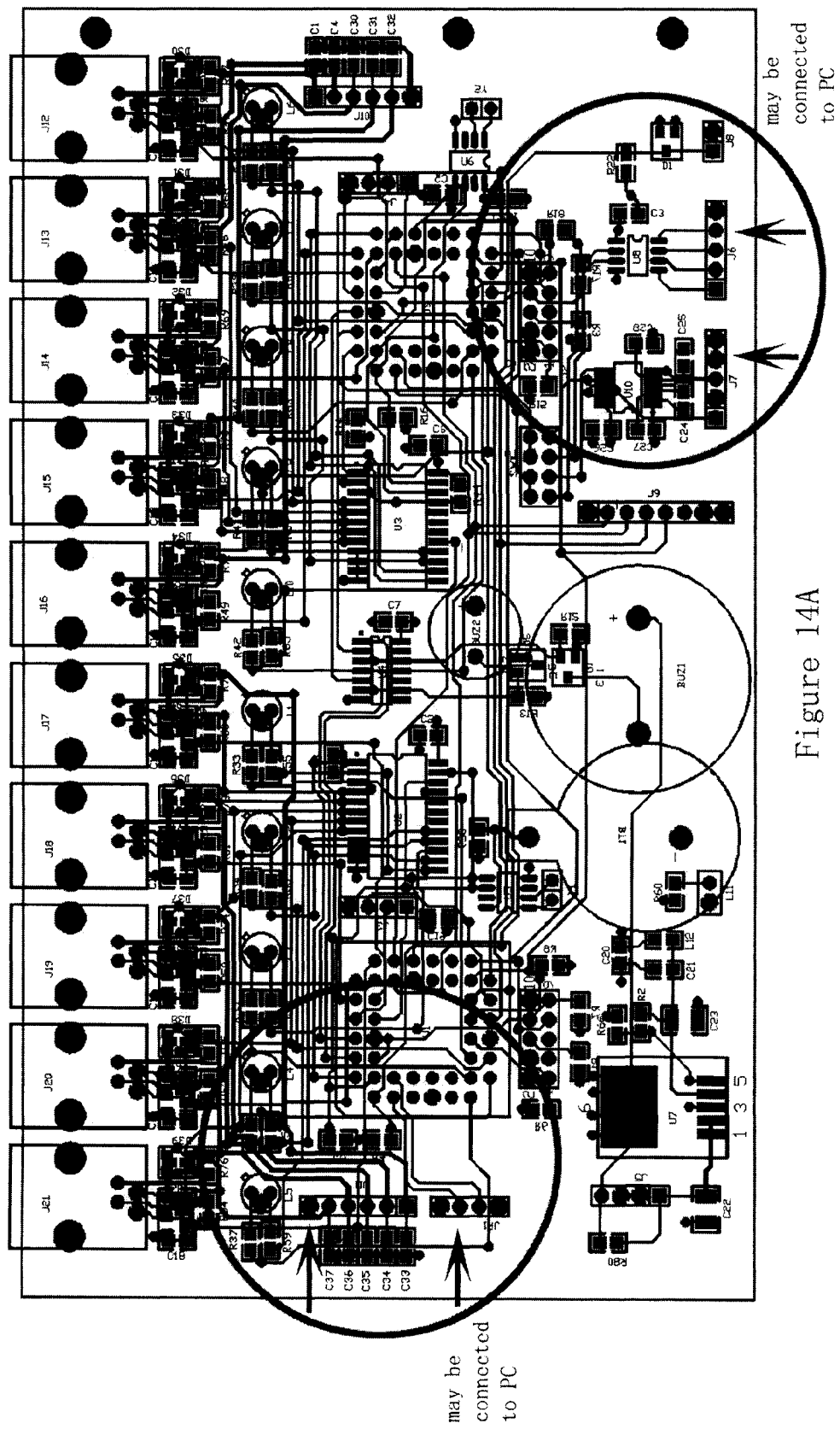
FIGS. 14A, B and C are schematics of circuit boards in the charging router of FIG. 12 with the connections circled for communication to a PC or network.
Figure 14B:
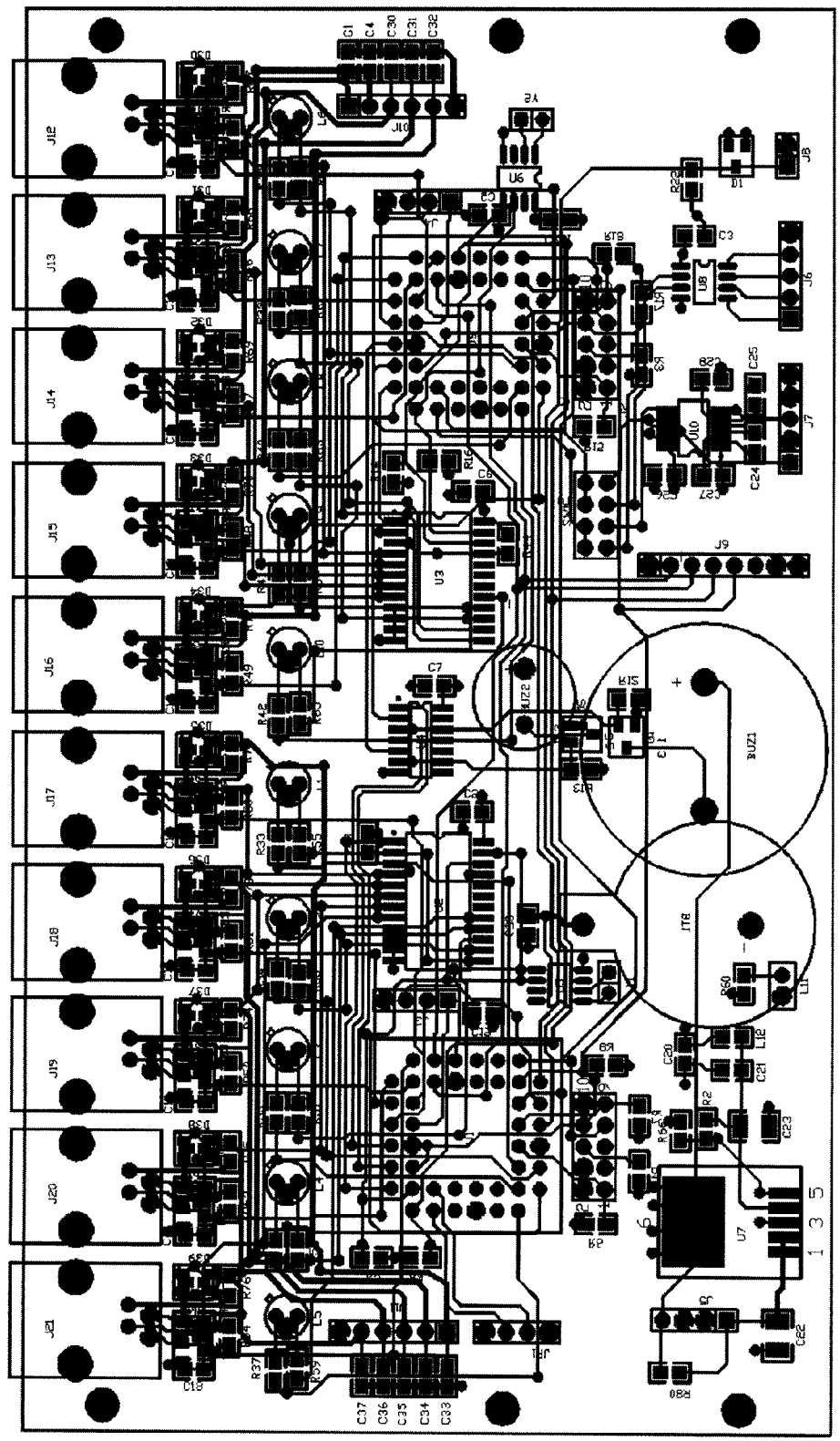
Figure 14C:
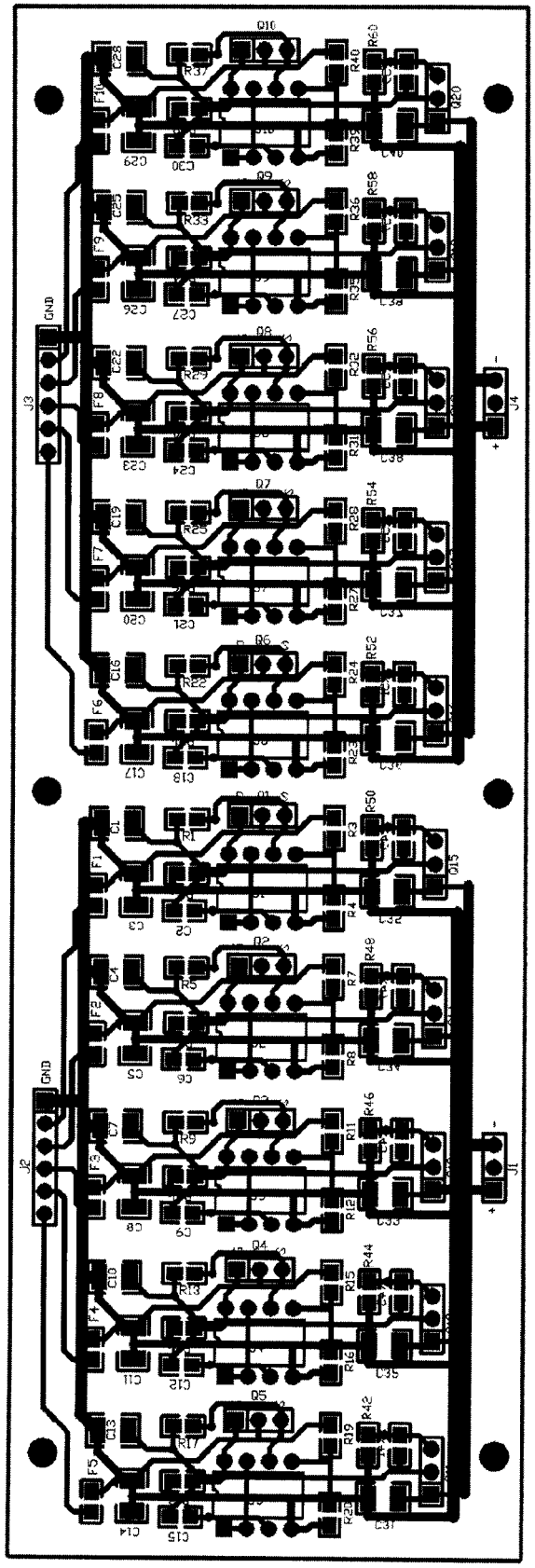

Referring now to FIG. 14 there is illustrated printed circuit boards contained within the router module of FIGS. 12A and B and indicating therein the circuitry required to accomplish the functions for said router module. In the preferred embodiment, ten positions on the circuit board are provided to connect with connectors 1 to 10 illustrated in FIGS. 12A and B and the required circuitry to allow for communication from a power supply through to those outlets 1 to 10. The board include positions for alarms and a secondary alarm and also positions circled allow for connection to a PC or a network. One skilled in the art of electronic circuits would readily understand FIGS. 14A, B and C and the aspects thereof to be incorporated into the router module and therefore providing such a description, which in fact is not a part of the inventions contained herein other than the logic contained within the two chips illustrated in FIG. 14A are individually inventive.

Referring generally to the figures there is illustrated the components of a fully modular charging and securing system for hand-held electronic devices. The system also may contain communication from the router module to a control computer or server for monitoring and displaying usage and status.

Main Components

1) Charging Router for charging up to 10 devices with charging status alarm
2) Recoiler with central core disposed in shrouded coaxial cable
3) Recoiler Module to engage recoiler
4) Hand-held product holder and mount
   2 mounting options: Vise or Pad Charging Router (HUB)—10 Port Charging with Alarm 1. Main difference in our logic is that we do not use a pair of wires to create a circuit that activates an alarm. This system charges a phone and we analyze the circuit from the Charging Router. There is no actual 'alarm circuit' in that the alarm is sound when the charging circuit has been broken.

We use a 2 conductor wire to charge the phone; the logic chip is programmed to analyze the circuit to detect changes in the current. If the 5 volt wire is cut the chip understands that power is no longer needed and goes into alarm.

For safety, we use 12 power supplies in the system:
   1-12 volt 2 amp
   1-5 volt 7 amp
   10-5 volt 0.700 amp This allows for some ports not to be used and does not change the current to the other ports. No port can draw more than 700 ma.

2. Central to the Charging Router are 2 programmable logic chips. These allow the unit to monitor the charging line and provide an alarm should the charging line be disconnected or cut.

3. The boards are ready for both a RS235 and RS485 connection to a PC or server. See FIG. 14 illustrating the portions of the circuit which may be connected to a PC.

4. The Charging Router may include an RF remote that staff can use to reset the Router.

Recoiler with Steel Core Co-Axial Cable

The 3 main components of the recoiler are i) cable, ii) the connector to the hand held product holder and iii) the receptacle for connecting to the module.

1. The coaxial cable. 2 conductor
   Core wire is 7 bundles of 7 wires steel cable tin plated.
   Insulated by normal means
   Braided copper strands act as conduits for passing current.
   A foil wrap if utilized has a plastic film laminated to the outside to allow conductivity
   Outside casing is standard PVC
   Please see drawings for specifications and notes on the contacts The advantage of a coaxial cable over the conventional is that it is less likely to twist up and get knotted.

Recoiler uses spinning bronze contacts as opposed to a single wire that both recoils and uncoils at the same time.

Unique aspects include
   Method of loading tension spring
   Spring loaded contact that is also a switch
   Magnets to switch both the media and reset alarm/power Recoiler Module The recoiler module acts as a receptacle for the connection through the hub, provides a housing for the magnetic switch and the spring contacts. It presently screws onto the recoiler housing, but may have a snap on connection.

The contacts are a unique aspect regarding the inner contact acting as a plunger to open the switch contact on the recoiler. The outer contact is spring loaded to allow full contact as the outer contact on the recoiler spins. The recoiler therefore may be static or in motion and yet still be capable of transmitting power to the hand-held device.

The module has been designed to allow different PC boards with different receptacles to be used without changing the tooling for the housing. Standard receptacles are RJ-11 for the alarm/charge system or mini USB for charge only.

Product Holder and Mount 2 options; Vise and Pad

As many changes can be made to the preferred embodiments of the invention without departing from the scope thereof. It is considered that all matter contained herein be considered illustrative of the invention and not in a limiting sense.

The embodiments of the invention in which an exclusive property or privilege is claimed are as follows:

1. A kit for a security system configured for hand-held electronic devices, the kit comprising:
   a coaxial cable connectable to a mounting pad and to a recoiler assembly for supplying electrical power from the recoiler assembly to the mounting pad;
   a mounting pad attachable to a hand-held electronic device;
   the mounting pad including a cable receiving portion engageable with the coaxial cable, and a charging circuit in electrical communication with the cable receiving portion;
   the charging circuit being engageable with the hand-held electronic device to provide electrical power for charging the hand-held electronic device;
   the recoiler assembly including a reel assembly provided with a housing, a spool retained within the housing upon which the coaxial cable may be wound and unwound, and a charging module attached to the housing;
   the recoiler assembly being configured to allow electrical communication between the coaxial cable and the charging module, when the coaxial cable is arranged on the spool;
   a connector cable connectable to the charging module and to a router for supplying electrical power from the router to the charging module; and
   a router capable of distributing electrical power from a power supply to a plurality of ports in the router;
   each port being configured for connection to the connector cable;
   when the security system is operational, the router being operable to monitor the charging circuit of the mounting pad in order to detect a drop in the current flowing therein and being further operable to trigger an alarm when a drop in current is detected in the charging circuit;
   when operatively assembled, the coaxial cable, the mounting pad, the recoiler assembly, the connector cable and the router cooperating with each other to define a loop carrying a charging current and serving as an alarm circuit for the hand-held electronic device.

2. The security system kit of claim 1 wherein the coaxial cable is provided with a first connector engageable with the mounting pad and a second connector engageable with the recoiler assembly;
   the first connector fitting over the coaxial cable;
   the coaxial cable being rotatable relative to the first connector.

3. The security system kit of claim 2 wherein the cable receiving portion of the mounting pad includes a hollow post configured for threaded engagement with the first connector;
   when the first connector is attached to the cable receiving portion of the mounting pad, the coaxial cable being rotatable relative to the cable receiving portion while still remaining in electrical communication therewith.

4. The security system kit of claim 1 wherein the coaxial cable includes a conductive core, an insulating coating disposed over the conductive core, a plurality of conductive strands disposed over the insulating coating, and an outer insulating layer disposed over the plurality of conductive strands.

5. The security system kit of claim 4 wherein the coaxial cable further includes a conducting foil disposed between the plurality of conductive strands and the outer insulating layer.

6. The security system kit of claim 4 wherein the conductive core is made of steel.

7. The security system kit of claim 4 wherein the conductive core includes a plurality of bundles of steel strands.

8. The security system kit of claim 7 wherein the plurality of bundles includes seven bundles.

9. The security system kit of claim 8 wherein each bundle includes seven steel strands.

10. The security system kit of claim 7 wherein strand is individually tin plated.

11. The security system kit of claim 4 wherein the plurality of conductive strands is selected from the group consisting of:
    (a) intertwined copper strands; and
    (b) braided copper strands.

12. The security system kit of claim 4 wherein the plurality of conductive strands includes four copper strands.

13. The security system kit of claim 1 wherein the mounting pad further includes means for securely holding the hand-held electronic device.

14. The security system kit of claim 13 wherein the holding means is selected from the group consisting of:
    (a) a clamping device and
    (b) a tape pad.

15. The security system kit of claim 1 wherein the mounting pad further includes switches capable of detecting whether the hand-held electronic device is attached to the mounting pad.

16. The security system kit of claim 1 wherein the cable receiving portion of the mounting pad includes a hollow post having arranged therein a contact pin for engagement with an end of the coaxial cable;
    the contact pin being connected to the charging circuit for electrical communication therewith.

17. The security system kit of claim 16 wherein the contact pin is spring-biased.

18. The security system kit of claim 1 wherein the charging circuit includes a charging cable extending from the mounting pad for connection to the hand-held electronic device.

19. The security system kit of claim 1 wherein the charging circuit includes an LED and a resistor;
    when the security system is operational, the router being operable to monitor the LED and resistor of the charging circuit.

20. The security system kit of claim 1 wherein:
    the spool includes a hub, a cable guide formed in the hub and a conductive element arranged within the hub and in electrical communication with the charging module;
    the hub has an aperture defined therein to allow a portion of the coaxial cable wound about the spool to pass therethrough toward the interior of the hub for retention by the cable guide; and the conductive element is configured to establish electrical communication between the coaxial cable and the charging module when the coaxial cable is retained within the cable guide.

21. The security system kit of claim 20 wherein the hub includes a recessed portion and the cable guide is disposed in the recessed portion of the hub.

22. The security system kit of claim 21 wherein the spool is spring-biased.

23. The security system kit of claim 22 wherein:
the reel assembly includes a spring assembly disposed within the housing for biasing the spool;
the spring assembly including a spring retaining member and a flat coil spring;
the flat coil spring having one end connected to the housing and the other end thereof connected to the spring retaining member;
in operation, the flat coil spring stores spring energy when the spool rotates in a first direction and a length of coaxial cable is paid out, and releases spring energy when the spool rotates in a second direction opposite to the first direction and the coaxial cable is wound about the spool.

24. The security system kit of claim 20 wherein;
the conductive element arranged within the hub is a first conductive element; and
the charging module includes a second conductive element engageable with the first conductive element of the spool to establish electrical communication between the coaxial cable and the charging module, when the coaxial cable is retained within the cable guide;
the second conductive element also being engageable with the connector cable for electrical communication therewith.

25. The security system kit of claim 1 wherein:
when the security system is operational, the hand-held electronic device attached to the mounting pad is moveable between a home position and a viewing position;
when in the viewing position, a portion of the coaxial cable is paid out from the spool; and
the recoiler assembly further includes means for detecting when the hand-held electronic device is in the viewing position.

26. The security system kit of claim 25 wherein the detecting means includes a magnetic switch assembly.

27. The security system kit of claim 26 wherein:
the reel assembly includes a spring assembly disposed within the housing for biasing the spool;
the spring assembly including a spring retaining member and a flat coil spring;
the flat coil spring having one end connected to the spool and the other end thereof connected to the spring retaining member;
the magnetic switch assembly includes a magnet carried on the spring retainer member and a magnetic switch disposed on the charging module.

28. The security system kit of claim 1 wherein the charging module is attached to the housing using one of fasteners and a snap on connection.

29. The security system kit of claim 1 wherein the plurality of ports includes ten ports.

30. The security system kit of claim 1 wherein:
the charging circuit of the mounting pad is a first charging circuit;
the router includes a plurality of charging circuits corresponding to the plurality of ports; when the security system is operational, one of the charging circuits of the plurality being in electrical communication with the hand-held electronic device to enable the charging thereof.

31. A kit for a security system configured for a plurality of hand-held electronic devices, the kit comprising:
a plurality of coaxial cables, each coaxial cable being connectable to one of a plurality of mounting pads and to one of a plurality of recoiler assemblies to supply electrical power from one of the plurality of recoiler assemblies to one of the plurality of mounting pads;
a plurality of mounting pads, each mounting pad being attachable to one hand-held electronic device of the plurality;
each mounting pad of the plurality including a cable receiving portion engageable with the coaxial cable of the plurality, and a charging circuit in electrical communication with the cable receiving portion;
the charging circuit of each mounting pad of the plurality being engaged with one of the hand-held electronic devices of the plurality to provide electrical power for the charging thereof;
each recoiler assembly of the plurality including a reel assembly provided with a housing, a spool retained within the housing upon which may be wound one of the coaxial cables of the plurality, and a charging module attached to the housing; each recoiler assembly of the plurality being configured to allow electrical communication between one of the coaxial cables of the plurality and the charging module of one of the recoiler assemblies of the plurality;
a plurality of connector cables, each connector cable being connectable to one of the charging modules of the plurality of recoiler assemblies and to a router to supply electrical power from the router to one of the charging modules of the plurality of recoiler assemblies; and
a router capable of distributing electrical power from a power supply to a plurality of ports in the router;
each port being configured for connection to one of the plurality of the connector cables;
when the security system is operational, the router being operable to monitor the charging circuit of each mounting pad of the plurality in order to detect a drop in the current flowing therein and being further operable to trigger an alarm when a drop in current is detected in one of the charging circuits of the plurality of mounting pads;
when operatively assembled, the plurality of coaxial cables, the plurality of mounting pads, the plurality of recoiler assemblies, the plurality of connector cables and the router cooperating with each other to define a plurality of loops;
each loop of the plurality carrying a charging current and serving as an alarm circuit for one of the hand-held electronic devices of the plurality.

32. A security system for hand-held electronic devices comprising:
a coaxial cable connected to a mounting pad and to a recoiler assembly to supply electrical power from the recoiler assembly to the mounting pad;
a mounting pad attached to the hand-held electronic device;
the mounting pad including a cable receiving portion engaged with the coaxial cable, and a charging circuit in electrical communication with the cable receiving portion;

the charging circuit being engaged with the hand-held electronic device to provide electrical power for the charging thereof;

the recoiler assembly including a reel assembly provided with a housing, a spool retained within the housing upon which is wound the coaxial cables of the plurality, and a charging module attached to the housing;

the recoiler assembly being configured to allow electrical communication between the coaxial cable and the charging module;

a connector cable being connected to the charging module and to a router to supply electrical power from the router to the charging module; and a router capable of distributing electrical power from a power supply to a plurality of ports in the router;

each port being configured for connection to the connector cable;

when the security system is operational, the router being operable to monitor the charging circuit of the mounting pad to detect a drop in the current flowing therein and being further operable to trigger an alarm when a drop in current is detected in the charging circuit;

in operation, the coaxial cable, the mounting pad, the recoiler assembly, the connector cable and the router cooperating with each other to define a loop carrying a charging current and serving as an alarm circuit for the hand-held electronic device.

33. A security system for a plurality of hand-held electronic devices comprising:

a plurality of coaxial cables, each coaxial cable of the plurality being connected to one of a plurality of mounting pads and one of a plurality of recoiler assemblies;

each coaxial cable of the plurality being capable of supplying electrical power from one of the plurality of recoiler assemblies to one of the plurality of mounting pads;

a plurality of mounting pads, each mounting pad of the plurality attached to one of the hand-held electronic devices of the plurality;

each mounting pad of the plurality including a cable receiving portion engaged with each coaxial cable of the plurality, and a charging circuit in electrical communication with the cable receiving portion;

the charging circuit of each mounting pad being engaged with one of the hand-held electronic devices of the plurality to provide electrical power for the charging thereof;

each recoiler assembly of the plurality including a reel assembly provided with a housing, a spool retained within the housing upon which is wound one of the coaxial cables of the plurality, and a charging module attached to the housing;

each recoiler assembly of the plurality being configured to allow electrical communication between one of the coaxial cables of the plurality and the charging module of one of the recoiler assemblies of the plurality;

a plurality of connector cables, each connector cable of the plurality being connected to one of the charging modules of the plurality of recoiler assemblies and to a router;

each connector of the plurality being capable of supplying electrical power from the router to one of the charging modules of the plurality of recoiler assemblies; and a router capable of distributing electrical power from a power supply to a plurality of ports in the router;

each port being configured for connection to one of the plurality of connector cables;

when the security system is operational, the router being operable to monitor the charging circuit of each mounting pad of the plurality in order to detect a drop in the current flowing therein and being further operable to trigger an alarm when a drop in current is detected in one of the charging circuits of the plurality of mounting pads;

in operation, the plurality of coaxial cables, the plurality of mounting pads, the plurality of recoiler assemblies, the plurality of connector cables and the router cooperating with each other to define a plurality of loops;

each loop of the plurality carrying a charging current and serving as an alarm circuit for one of the hand-held electronic devices of the plurality.

\* \* \* \* \*